United States Patent
Tsuda et al.

(10) Patent No.: US 9,846,551 B2
(45) Date of Patent: *Dec. 19, 2017

(54) SYSTEM ON A CHIP INCLUDING A MANAGEMENT UNIT FOR ALLOCATING AND DEALLOCATING AN ADDRESS RANGE

(71) Applicant: Renesas Electronics Corporation, Tokyo (JP)

(72) Inventors: Tetsuji Tsuda, Kanagawa (JP); Yoshiyuki Ito, Kanagawa (JP)

(73) Assignee: Renesas Electronics Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/427,207

(22) Filed: Feb. 8, 2017

(65) Prior Publication Data

US 2017/0147252 A1   May 25, 2017

Related U.S. Application Data

(63) Continuation of application No. 14/593,091, filed on Jan. 9, 2015, now Pat. No. 9,619,407.

(30) Foreign Application Priority Data

Feb. 6, 2014 (JP) ................................. 2014-021127

(51) Int. Cl.
*G06F 12/00* (2006.01)
*G06F 3/06* (2006.01)

(52) U.S. Cl.
CPC ............ *G06F 3/0631* (2013.01); *G06F 3/065* (2013.01); *G06F 3/0613* (2013.01);
(Continued)

(58) Field of Classification Search
CPC .... G06F 3/0631; G06F 3/0613; G06F 3/0688; G06F 3/0659; G06F 3/065; G06F 12/00
(Continued)

(56) References Cited

U.S. PATENT DOCUMENTS 9,619,407 B2 * 4/2017 Tsuda ................. G06F 13/1668
2002/0166017 A1   11/2002 Kim et al.
(Continued)

FOREIGN PATENT DOCUMENTS

JP     06-324999 A    11/1994
JP     2010-097311 A   4/2010

OTHER PUBLICATIONS

Office Action dated Jul. 11, 2017, in Japanese Patent Application No. 2014-021127.

*Primary Examiner* — Hong Kim
(74) *Attorney, Agent, or Firm* — Shapiro, Gabor and Rosenberger, PLLC

(57) ABSTRACT

A processor system (10) includes: a first memory controller (16) that controls writing/reading data to/from a first memory (60); a second memory controller (17) that controls writing/reading data to/from a second memory (70); a first processor (13) that inputs and outputs the data from and to the first memory through a bus (14); a second processor (11) that inputs and outputs processed data from and to the second memory through the bus; and a management unit 32 that deallocates an address range corresponding to the second memory from the first process and allocates the address range to the second processor.

8 Claims, 21 Drawing Sheets

(52) U.S. Cl.
CPC .......... *G06F 3/0659* (2013.01); *G06F 3/0688* (2013.01); *G06F 12/00* (2013.01)

(58) Field of Classification Search
USPC ............................ 711/170, 173, 4, 154, 211
See application file for complete search history.

(56) References Cited

U.S. PATENT DOCUMENTS

| | | |
|---|---|---|
| 2005/0015625 A1 | 1/2005 | Inoue et al. |
| 2005/0140685 A1 | 6/2005 | Garg |
| 2007/0156947 A1 | 7/2007 | Vaithiananthan et al. |
| 2010/0115170 A1* | 5/2010 | Jeong .................... G06F 15/163 710/308 |
| 2011/0153691 A1 | 6/2011 | Allen et al. |
| 2011/0193988 A1 | 8/2011 | Hatano |
| 2013/0246599 A1 | 9/2013 | Yan |

\* cited by examiner

SYSTEM ON A CHIP INCLUDING A MANAGEMENT UNIT FOR ALLOCATING AND DEALLOCATING AN ADDRESS RANGE

CROSS-REFERENCE TO RELATED APPLICATIONS

This application is based upon and claims the benefit of priority from Japanese patent application No. 2014-21127, filed on Feb. 6, 2014, the disclosure of which is incorporated herein in its entirety by reference.

BACKGROUND

The present invention relates to a semiconductor apparatus, a processor system and a control method thereof.

Japanese Unexamined Patent Application Publication No. 1994-324999 discloses a multiprocessor system which has a plurality of storage controllers. The multiprocessor system disclosed in Japanese Unexamined Patent Application Publication No. 1994-324999 includes instruction processors IP0 to IP3 and storage controllers SC0 and SC1. The instruction processors IP0 and IP1 are connected to the storage controller SC0. The instruction processors IP2 and IP3 are connected to the storage controller SC1.

The storage controllers SC0 and SC1 are connected to both of main storages MS0 and MS1 through signal lines. Then, the main storages MS0 and MS1 are connected to all of the instruction processors IP0 to IP3 and can transmit data, which is read out from either main storage, to all of the instruction processors IP0 to IP3.

SUMMARY

The present inventors have found the following problems in the multiprocessor system disclosed in Japanese Unexamined Patent Application Publication No. 1994-324999. Since two instruction processors are connected to one main storage controller, the instruction processor cannot secure a sufficient data band width due to band bias. Especially, if the instruction processors are image processors which perform image processing, it is required to secure the sufficient band width. If the image processors cannot secure the sufficient band width, there is a possibility that frame dropping may occur during playing of a video.

Other problems and novel features will become obvious from the following description and the accompanying drawings of the present application.

According to a first aspect of the invention, a processor system includes a first processor that inputs and outputs data from/to a first memory through a bus; a second processor that inputs and outputs processed data from/to a second memory through the bus; and a memory management unit that deallocates an address range corresponding to the second memory from the first process and allocates the address range to the second processor.

Note that a system according to the above stated example may be valid as the present embodiment when the same takes a form of a method, a system, or a program for allowing a computer to execute a process, which is otherwise executed by a device or a portion thereof, and a semiconductor apparatus which includes the system.

According to the first aspect of the invention, it is possible to secure a data band width of the processor.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
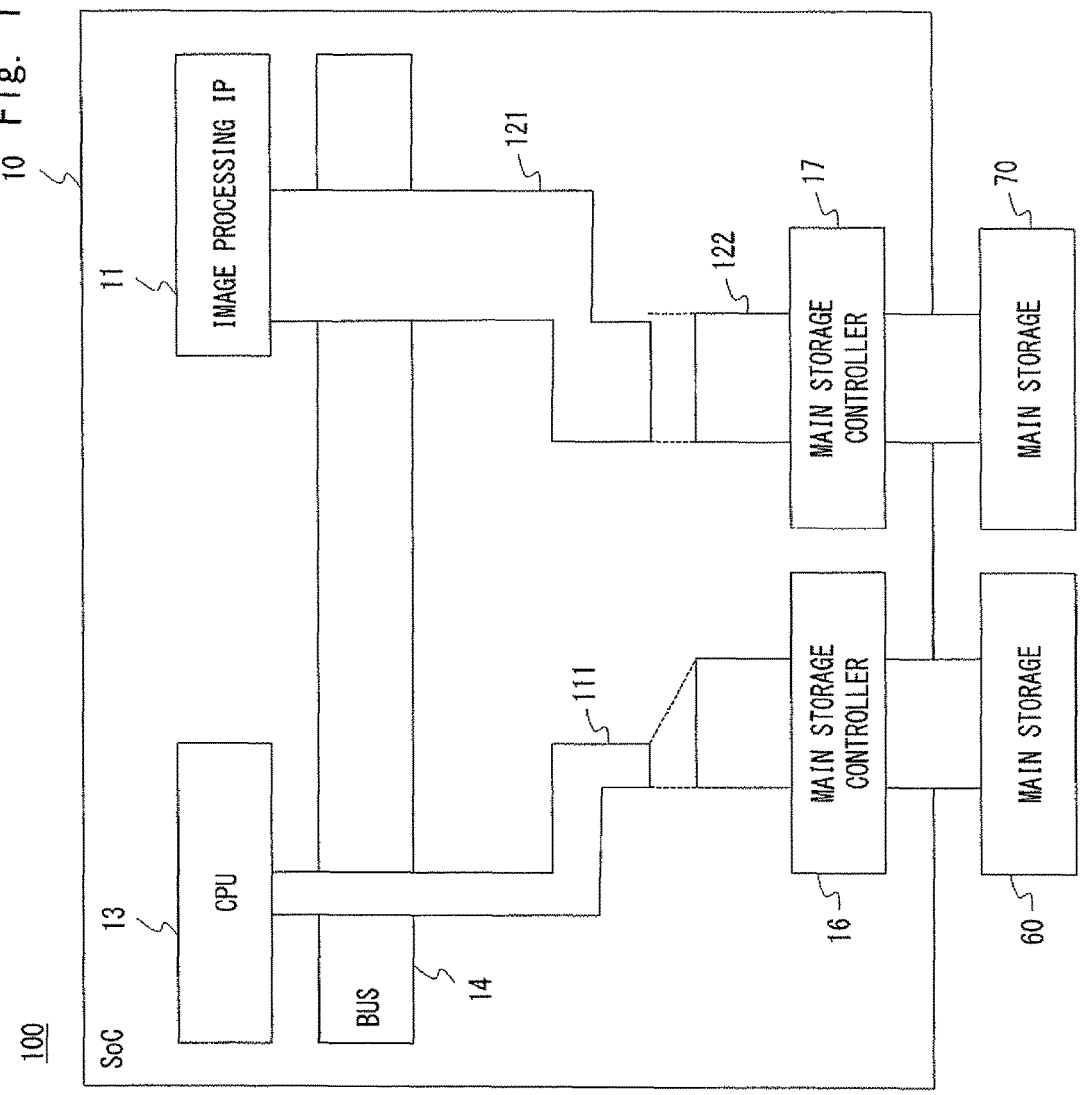
FIG. 1 is a block diagram showing a structure of a semiconductor apparatus according to a first embodiment.

For the sake of clarity, the following description and drawings may be simplified and abbreviated in an appropriate manner. Further, elements, which are depicted in the drawings as function blocks arranged to execute various processes, may each be configured, as hardware, by a CPU, a memory, or a circuit in another form, or, as software, by a program loaded into a memory. Accordingly, these function blocks may be realized in a form of hardware, software, or a combination of the two as commonly understood by persons having ordinary skill in the art, and are not be limited to any specific form. Further, it is to be noted that the elements having substantially the same features depicted in the drawings will be assigned the same reference numerals, and the description thereof will not be repeated as appropriate.

Further, the program may be stored by using various types of non-transitory computer readable medium, and supplied to computers. The non-transitory computer readable medium includes various types of tangible storage medium. Examples of the non-transitory computer readable medium include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, and a semiconductor memory (such as a mask ROM, a PROM (Programmable ROM), an EPROM (Erasable PROM), a flash ROM, and a RAM (Random Access Memory)). Further, the program may be supplied to computers by using various types of transitory computer readable media. Examples of the transitory computer readable media include an electrical signal, an optical signal, and an electromagnetic wave. The transitory computer readable media may be used to supply programs to computer through a wire communication path such as an electrical wire and an optical fiber, or wireless communication path.

First Embodiment

Hereinafter, a processor system and a semiconductor apparatus according to a present embodiment will be described with reference to FIG. 1. FIG. 1 is a block diagram showing a whole structure of a semiconductor apparatus 100. The semiconductor apparatus 100 includes a processor system 10, a first storage 60 and a second storage 70.

The processor system is, for example, a SoC (System On a Chip) and is used for a car navigation system, an information entertainment equipment and so on. The processor system 10 includes an image processing IP 11, CPU (Central Processing Unit) 13, a bus 14, a first main storage controller 16 and a second main storage controller 17. The processor system 10 is a multiprocessor system which has a plurality of processors.

The image processing IP 11 is, for example, an image processor and performs image processing. For example, the image processing IP 11 is an IP (Intellectual Property) core which decodes or encodes image data. The image processing IP 11 generates image processing data necessary for the image processing. The image processing IP 11 is connected with the first main storage controller 16 and the second main storage controller 17 through the bus 14.

The CPU 13 is a processor which controls the entire system. When the processor system is used for a car navigation system, the CPU 13 executes a process such as a route search or an orientation of a current position. That is, the CPU 13 performs processes other than the image processing. Therefore, the semiconductor apparatus can be used for a predetermined application. The CPU 13 is connected with the first main storage controller 16 and the second main storage controller 17 through the bus 14. Assuming that the CPU 13 is a first processor, the image processing IP 11 is a second processor.

The first main storage controller 16 is a first memory controller, and controls writing/reading data to/from the first main storage 60. The second main storage controller 17 is a second memory controller, and controls writing/reading data to/from the second main storage 70.

The main storage 60 and the second main storage 70 are, for example, main memories such as SDRAMs (Synchronous Dynamic Random Access Memory). The main storage 60 and the second main storage 70 store data which is used for a process in the processor system 10. The main storage 60 and the second main storage 70 are universal memories which are available to both the CPU 13 and the image processing IP 11.

The first main storage controller 16 reads out a data from the first main storage 60, and outputs the data to the CPU 13. The first main storage controller 16 writes a data output from the CPU 13 to the first storage 60. As mentioned above, the CPU 13 inputs and outputs the data from and to the first main storage 60 though the bus 14.

The second main storage controller 17 reads out a data from the second main storage 70, and outputs the data to the image processing IP 11. The second main storage controller 18 writes a data output from the CPU 13 to the second storage 70. As mentioned above, the image processing IP 11 inputs and outputs the data from and to the second main storage 70 though the bus 14.

Figure 2:
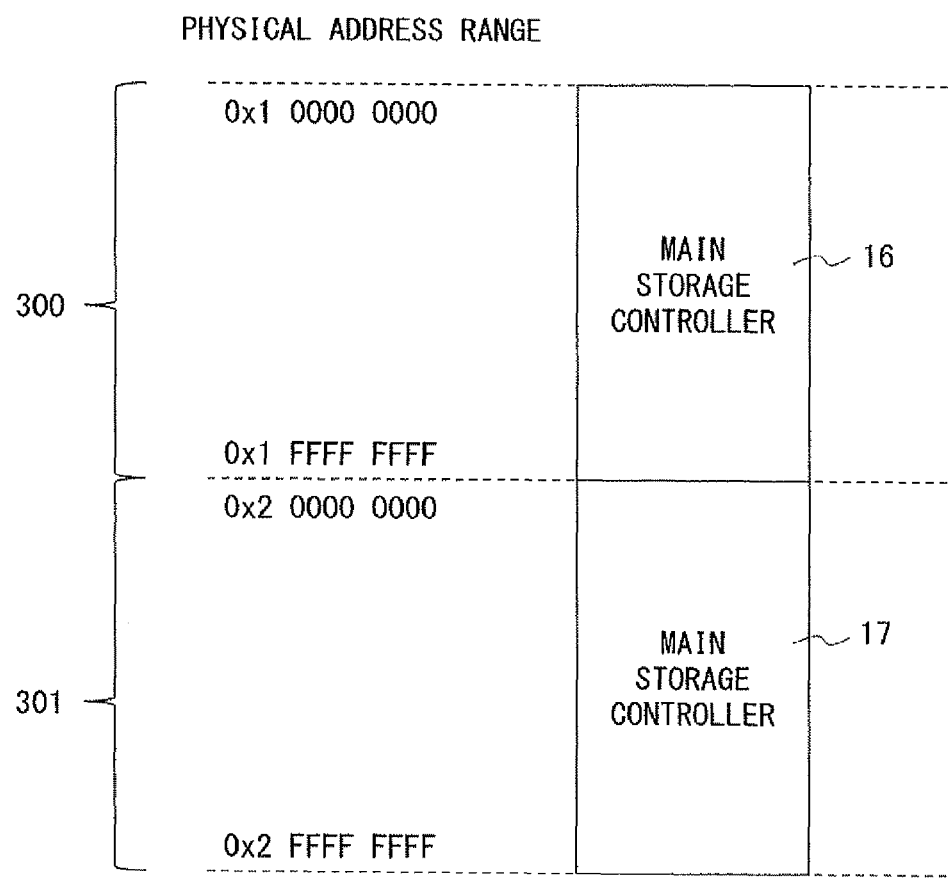
FIG. 2 shows an address range corresponding to first and second main storage controllers.

Hereinafter, an address range corresponding to the first main storage controller 16 and the second main storage controller 17 will be described with reference to FIG. 2. FIG. 2 is a schematic diagram illustrating a physical address range of the memories corresponding to the first and second main storage controllers. The first main storage controller 16 corresponds to an address range 300 from 0x10000 0000 to 0x1 FFFF FFFF. The second main storage controller 17 corresponds to an address range 301 from 0x2 0000 0000 to 0x2 FFFF FFFF. Therefore, if software can occupy a specific address range, the software can occupy the second main storage controller 17.

Figure 3:
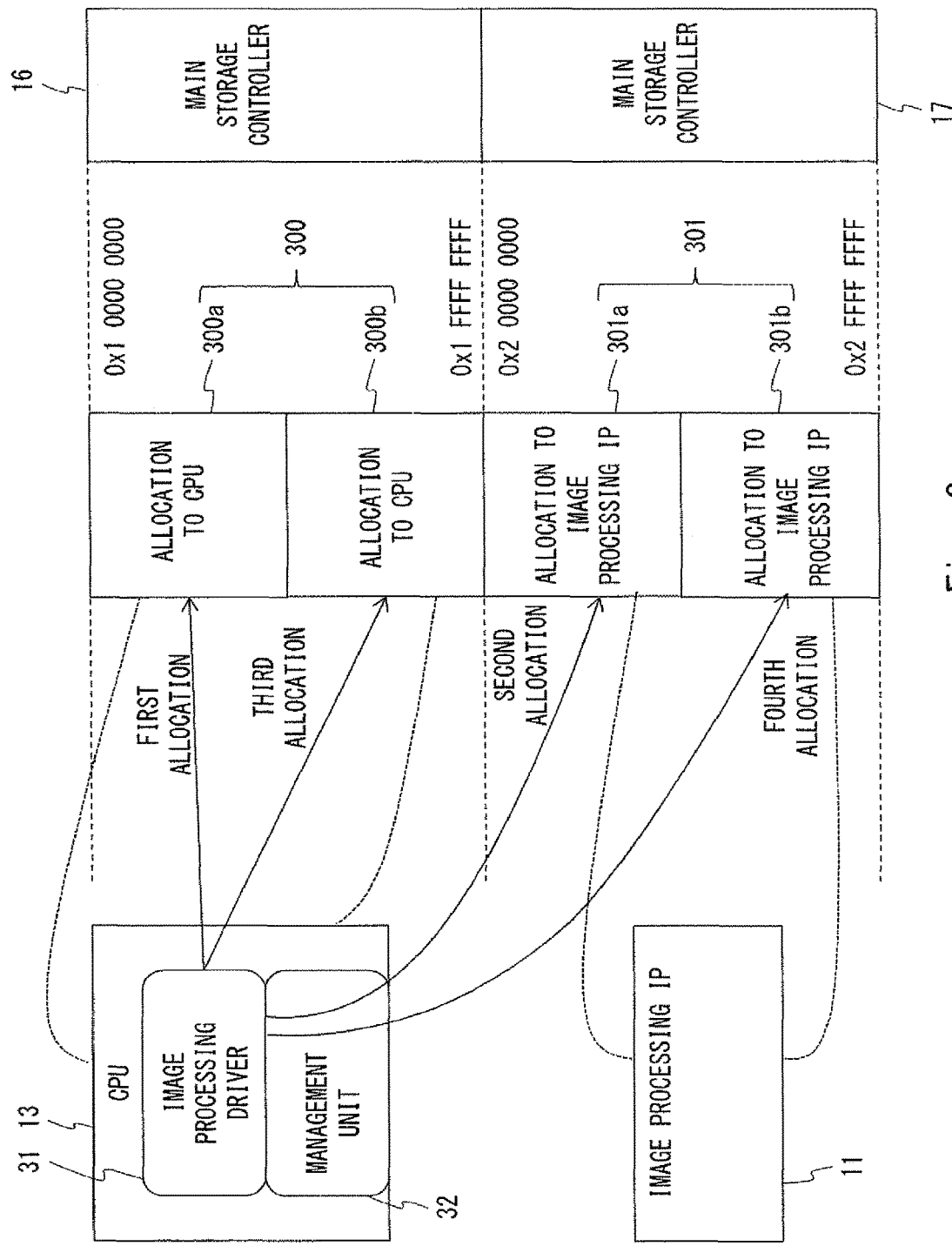
FIG. 3 is a schematic diagram illustrating an allocating process of a memory by a management unit of a CPU and an image processing driver.

An allocation process of memory space will be described with reference to FIG. 3. FIG. 3 is a schematic diagram illustrating the allocation process of the memory space performed by the CPU 13. The CPU 13 includes an image processing driver 31 and a management unit 32. The image processing driver 31 controls the image processing IP 11. For example, the image processing driver 31 performs an allocation of the address range 300 corresponding to the first main storage controller 16. The management unit 32 is software which has a memory management function to manage the memory. The management unit 32 performs an allocation of the address range 301 corresponding to the second main storage controller 17. In other words, the image processing driver 31 and the management unit 32 together perform the allocation of the address range 301.

The allocation of the memory during an image processing will be described. First, in a first allocation process, the image processing driver 31 allocates a region 301a to the CPU 13. In a second allocation process, the management unit 32 allocates a region 301a to the image processing IP 11. In a third allocation process, the image processing driver 31 allocates a region 300b to the CPU 13. In a fourth allocation process, the management unit 32 allocates a region 301b to the image processing IP 11. The CPU 13 and the image processing IP 11 write/read data to/from the allocated regions.

The region 300a and the region 300b are included in the address range 300, or in the address range corresponding to the first main storage controller 16. For example, the region 300a is a first half part of the address range 300, and the region 300b is a second half part of the address rang 300. The region 301a and the region 301b are included in the address range 301, or in the address range corresponding to the second main storage controller 17. For example, the region 301a is a first half part of the address range 301, and the region 301b is a second half part of the address range 301. Of course, the address ranges 300 and 301 can be divided into three or more regions, and the allocation can be performed in series.

The region 301a and the region 301b which are allocated by the management unit 32 are routed through the second main storage controller 17. On the other hand, the region 300a and the region 300b which are allocated by the image processing driver 31 are routed through the first main storage controller 16. Therefore, only the image processing IP 11 uses the region 301a and region 301b, and thus the image processing IP 11 can occupy the second main storage controller 17. That is, the management unit 32 allocates the address range of the second main storage 70 exclusively to the image processing IP 11. Accordingly, the image processing IP 11 can secure a sufficient band width.

As shown in FIG. 1, a data band width 121 of the image processing IP 11 fits into a data band width 122 of the second main storage controller 17. That is, if a data band width 111 of the CPU 13 widens, processed data of the CPU 13 cannot be routed through the second main storage controller 17. If the image processing IP 11 and the CPU 13 operate at the same time, the image processing IP 11 can occupy the second main storage controller 17.

Figure 4:
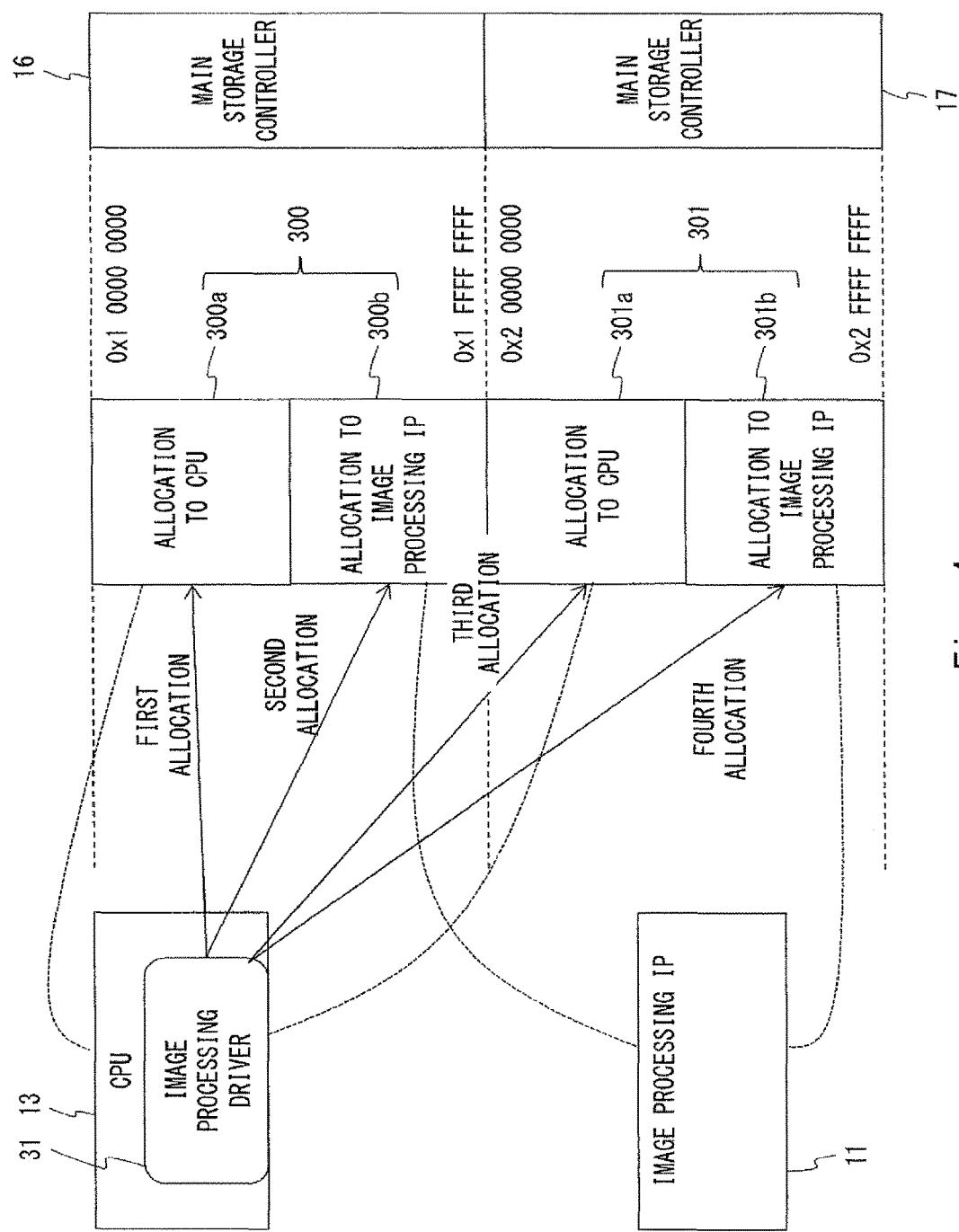
FIG. 4 is a schematic diagram illustrating the allocating process of the memory by the image processing driver.

For comparison, a configuration in which the image processing driver 31 performs an allocation process without the management unit 32 will be described with reference to FIG. 4. FIG. 4 is a schematic diagram illustrating the allocating process without the management unit 32.

A beginning address and a size of the memory space are set to the image processing driver 31 at start-up. Then, the set size is allocated in the memory space starting from the beginning address. In this case, which of the address space of the first main storage controller 16 or that of the second main storage controller 17 is allocated is determined depending on a sequence of the allocation For example, a case in which the memory space is allocated to the CPU 13 and the image processing IP 11 twice, respectively, will be described. The image processing driver 31 allocates a memory space with the beginning address of 0x1 0000 0000 and the size of 0x2 0000 0000. In a first allocation process, the image processing driver 31 allocates the region 300a to the CPU 13. In a second allocation process, the image processing driver 31 allocates the region 300b to the image processing IP 11. In a third allocation process, the image processing driver 31 allocates the region 301a to the CPU 13. In a fourth allocation process, the image processing driver 31 allocates the region 301b to the image processing IP 11.

The CPU 13 secures the region 300a of the address range 300 and the region 301a of the address range 301. The image processing IP 11 secures the region 300b of the address range 300 and the region 301b of the address range 301. The image processing IP 11 cannot occupy a specific main storage controller.

On the other hand, in the present embodiment, the image processing driver 31 designates only the address range of the first main storage controller 16 to a usage range of the CPU 13 as shown in FIG. 3. Furthermore, the image processing driver 31 has the management unit 32 which manages only the address range of the second main storage controller 17. The image processing driver 31 set a memory address which is allocated by the management unit 32 to the image processing IP 11. In other words, when an allocated range is included in the address range of the second main storage 70, the management unit 32 allocates this range to be allocated to the image processing IP 11. The management unit 32 deallocates the address range corresponding to the second main storage 70 from the CPU 13, and allocates the deallocated address range to the image processing IP 11. Accordingly, the image processing IP 11 can occupy the second main storage controller 17 at all times.

The management unit 32 manages the allocation of the memory relating to an address range which accesses the second main storage controller 17. The management unit 32 operates independently of the image processing driver 32. Therefore, the region 301a and the region 301b under the control of the management unit 32 are not interfered with by the memory allocation operation of the image processing driver 31, if the image processing driver 31 does not manage correspondence between the address range and the main storage controller. Accordingly, the second main storage controller 17 can be exclusively occupied by the image processing IP 11.

Therefore, it is possible to secure the sufficient band width for the process of the image processing IP 11. Therefore, it is possible to reduce a waiting time of the image processing IP 11 to access data. It is also possible to prevent frame dropping and so on during playing of a video Second Embodiment In this embodiment, a processor system 10 differs from that of the first embodiment in that the processor system 10 embeds the universal OS. Since this embodiment is similar to the first embodiment except that the processor system 10 embeds the universal OS, some of the description thereof is omitted as needed. For example, the semiconductor apparatus 100 and the processor system 10 have a structure similar to those of the first embodiment.

Figure 5:
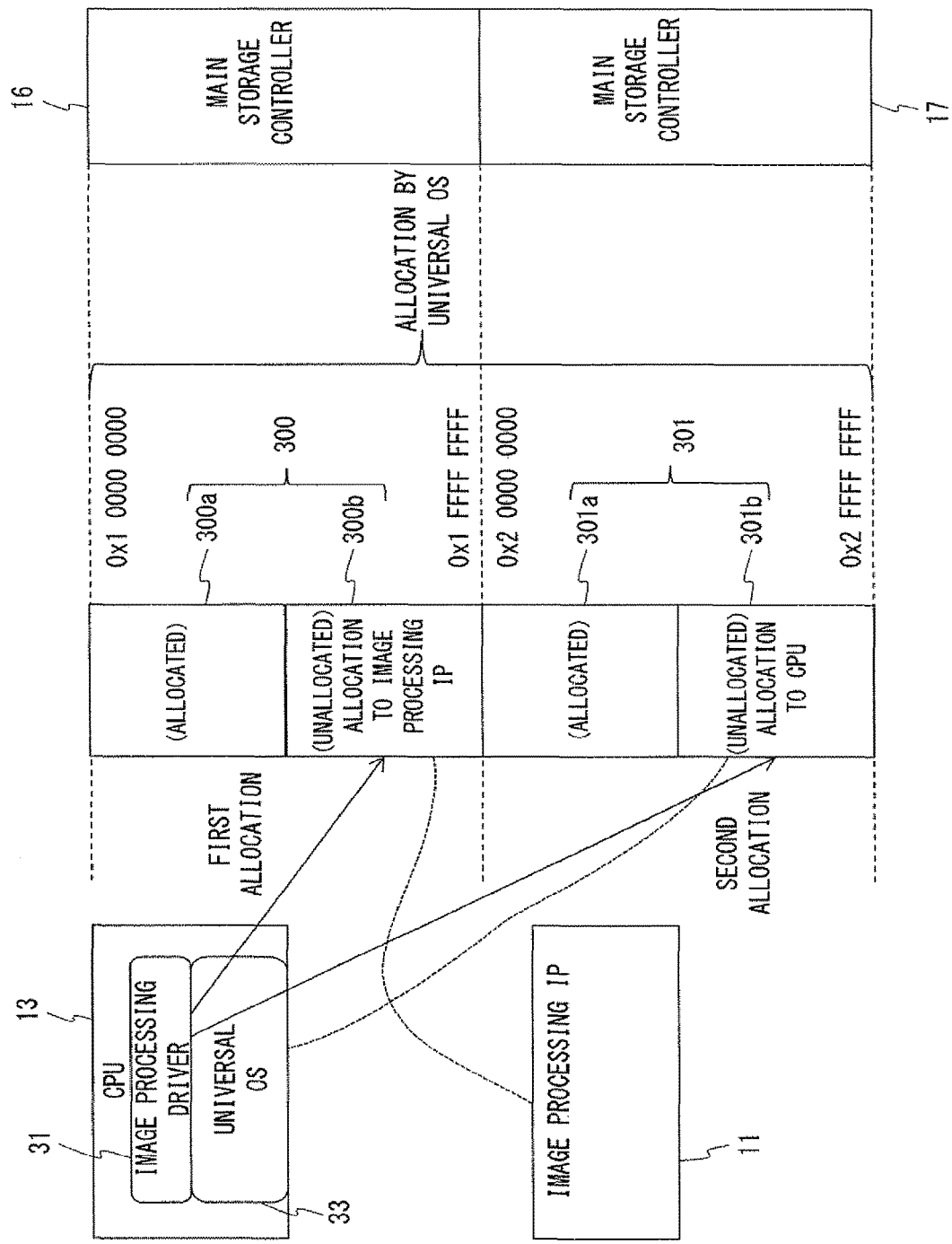
FIG. 5 is a schematic diagram illustrating an allocation of the memory by a universal OS.

First, the problem of the processor system which embeds the universal OS will be described. FIG. 5 is a schematic diagram illustrating an allocation process of a memory space in the processor system which embeds the universal OS.

The universal OS 33 is, for example, Linux (registered trademark) or Windows (registered trademark). The universal OS 33 allocates the memory space. The universal OS 33 allocates, for example, an address space of the first main storage 60 and the second main storage 70 to an application of the universal OS 33 and so on. The application of the universal OS 33 is, for example, a calculator. The image processing driver 31 operates under the control of the universal OS 33.

When a memory allocation request is received, the universal OS 33 allocates unallocated regions at the time of the allocation in order. For example, assume that a region 300a and a region 301a have been allocated and a region 301b and a region 301b are unallocated as shown in FIG. 5. The region 300a is allocated to the application of the universal OS 33. The region 301a is allocated to the image processing IP 11.

The universal OS 33 allocates unallocated regions 300b and 301b to the image processing IP 11 and the CPU 13 in order. In a first allocation process, the universal OS 33 allocates a vacant region 300b to the image processing IP 11. In a second allocation process, the universal OS 33 allocates a vacant region 300b to the CPU 13.

Figure 6:
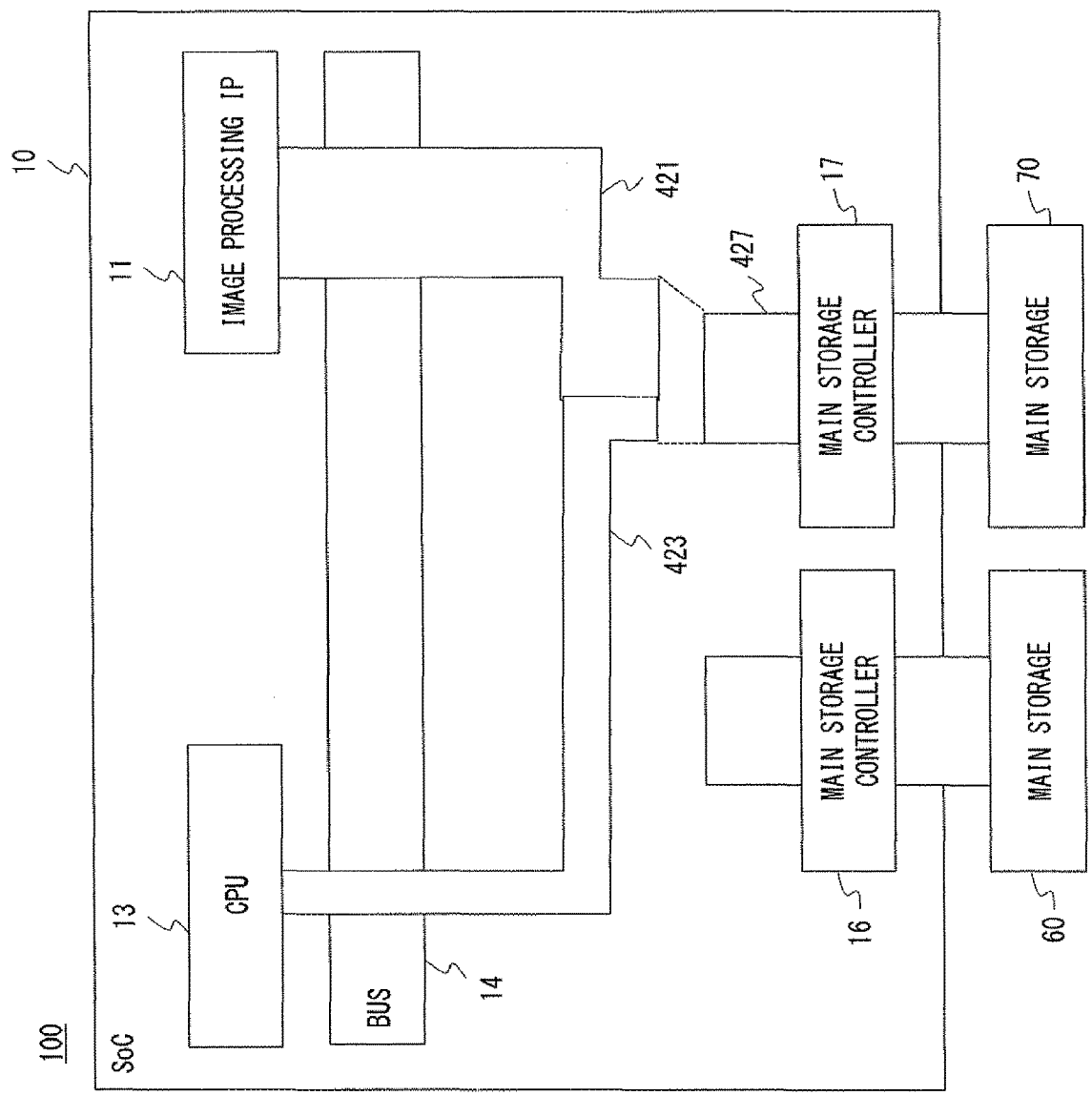
FIG. 6 is a schematic diagram illustrating an example in which data from the CPU and an image processing IP are routed through the second memory controller.

In this case, the image processing IP 11 and the CPU 13 share the second main storage controller 17 as shown in FIG. 6. Accordingly, the sum of a data band width 423 of the CPU 13 and a data band width 421 of the image processing IP 11 may be over a data band width 427 of the second main storage controller 17. The image processing IP 11 may not secure a desirable data band width. In this case, a waiting time of the image processing IP 11 to access data is increased, and thus frame dropping may occur.

Figure 7:
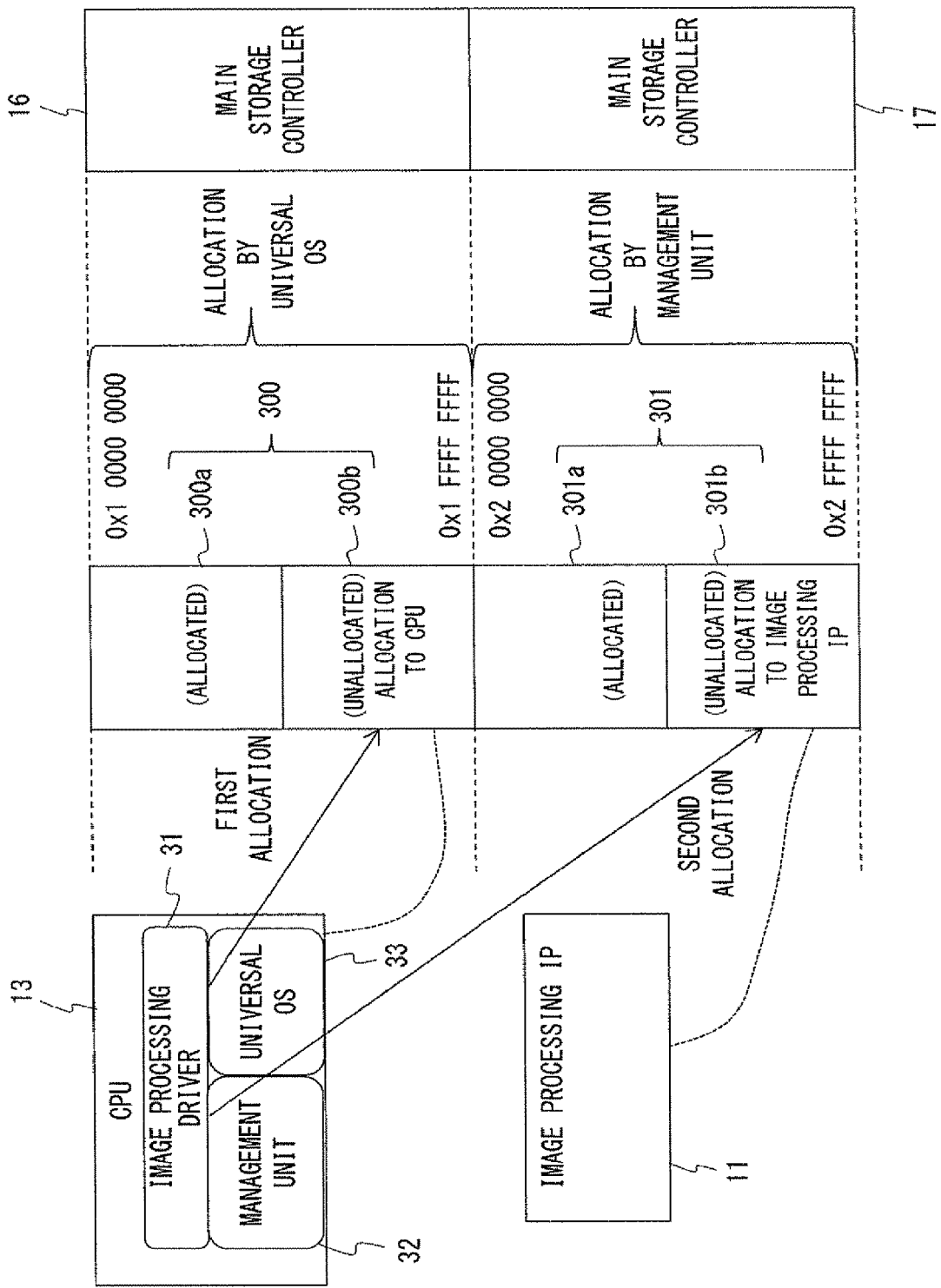
FIG. 7 is a schematic diagram illustrating the allocating process of the memory according to a second embodiment.

In this embodiment, the address range 301 corresponding to the second main storage controller 17 is deallocated from under the control of the universal OS 33 at start-up. A management unit 32 which manages the address range 301 is added to the CPU 13 separately from the universal OS 33. The allocation process according to this embodiment will be described with reference to FIG. 7. FIG. 7 is a schematic diagram illustrating a control method of the processor system according to the present embodiment.

The region 300a which is a first half part of the address range 300 and the region 301a which is a second half part of the address range 301 have already been allocated. The region 300a has been allocated to another application such as the calculator. The region 301a has been allocated to the image processing IP 11.

When an allocation request is received, the universal OS 33 performs the allocation of the unallocated region. The universal OS 33 allocates region 300b to the CPU 13 with the image processing driver 31. The universal OS 33 receives an allocation request of the memory space from the image processing driver 31, and performs a management. The universal OS 33 allocates at least one part of the address range of the first main storage 60 to the CPU 13. The management unit 32 performs the allocation of the unallocated region 301b independently from the universal OS 33. The management unit 32 allocates the region 301b to the image processing IP 11. As described above, the management unit 32 manages the allocation of the address range 301. In other words, the management unit 32 allocates the memory space which is used by the second main storage controller 17. This can make the image processor IP 11 occupy the second main storage 17.

As described above, the management unit 32 manages the allocation of the memory relating to the address range 301 to access the specific second main storage controller 17. Then, the management unit 32 performs the allocation process independently
of the allocation process of the universal OS 33. The regions 301a and 301b under the control of the management unit 32 are not interfered with by the memory allocation operation of the universal OS 33, which does not know the correspondence between the address range and the main storage controller.

The management unit 32 allocates the memory space under the control of the universal OS 33 and the image processing driver 31 which operates under the control of the universal OS 33. This can make the image processing driver 31 operate under the control of the universal OS 33. Therefore, it is possible to achieve application of various functions provided by the universal OS 33 and to secure the data band width of the image processing IP 11.

The data band width 121 of the image processing IP 11 fits into the data band width 122 of the second main storage controller 17 as shown in FIG. 1. That is, even if the data band width 111 of the CPU 13 widens, the processed data of the CPU 13 cannot be routed through the second main storage controller 17. Even if the image processing IP 11 and the CPU 13 operate at the same time, the image processing IP 11 can occupy the second main storage controller 17. The image processor IP 11 can secure a desirable data band width. It is possible for the image processor IP 11 to reduce a waiting time for data access, and to prevent the frame dropping.

Third Embodiment

In the second embodiment, the address range corresponding to the second main storage controller 17 is deallocated from under the control of the universal OS 22 at the start-up of the processor system 10. Therefore, the image processor IP 11 occupies the second main storage controller 17 regardless of whether the image processor IP 11 is in use or not. That is, when the image processor IP 11 is not in use, the address range of the second main storage controller 17 is not in use. Therefore, the memory cannot be effectively used.

Therefore, in this embodiment, the image processor IP 11 occupies the second main storage controller 17 only when the image processor IP 11 is in use. That is, when the image processor IP 11 is not in use, the address range 301 of the second main storage controller 17 is allocated to the CPU 13. For example, when the image processor IP 11 is in use, the address range 301 (0x2 0000 0000 to 0x2 FFFF FFFF) corresponding to the second main storage 70 is deallocated from under the control of the universal OS 33. By adding the management unit 32 independently from the universal OS 33, the management unit 33 can manage the address range 301.

After using the image processor IP 11, the address range 301 is brought back to under the control of the universal OS 33 again. That is, after the process of the image processor IP 11 is completed and the operation of the image processor IP 11 is stopped, the universal OS 33 manages the address range 301. Therefore, the image processor IP 11 can occupy the second main storage controller 17 only when the image processor IP 11 operates, and thus it is possible to secure the desirable band width. Furthermore, when the image processor IP 11 is not in use, the universal OS 33 can use not only the address range 300 but also the address range 301. Therefore, it is possible to use the memory effectively.

Figure 8:
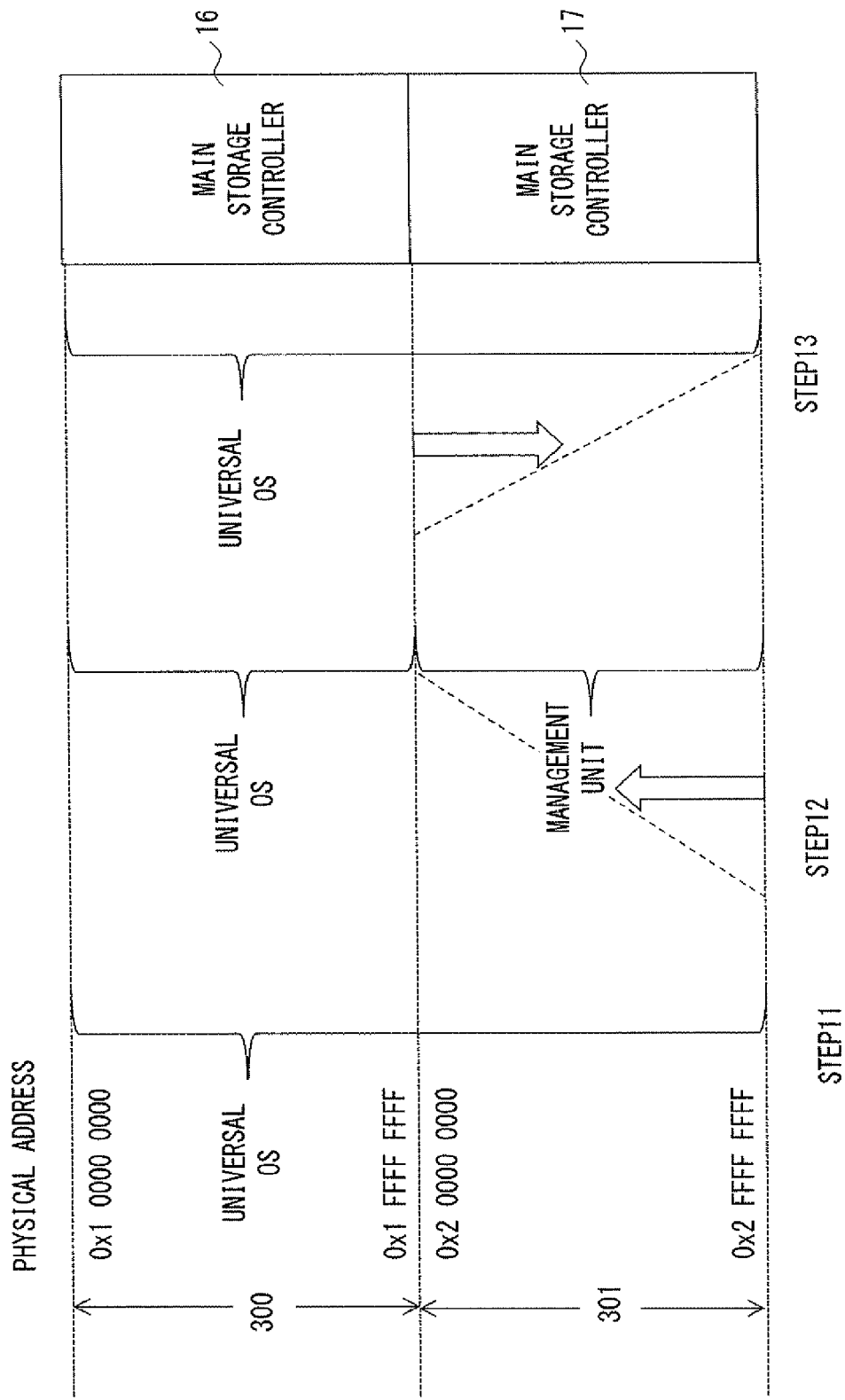
FIG. 8 is a schematic diagram illustrating the allocating process of the memory according to a third embodiment.

A control method of the processor system according to the third embodiment will be described with reference to FIG. 8. FIG. 8 is a schematic diagram illustrating the allocation process of the second main storage controller 17 by the universal OS 33 and the management unit 32. Since this embodiment is similar to the first and second embodiments except that the address range 301 is allocated to the CPU 13 when the image processor IP 11 is not in use, some of the description thereof is omitted as needed. For example, the semiconductor apparatus 100 and the processor system according to this embodiment have a structure similar to those of the first and second embodiments. Accordingly, the description thereof is omitted as needed.

When the image processor IP 11 is not in use, the universal OS 33 manages the address ranges 300 and 301 corresponding to the first main storage controller 16 and the second main storage controller 17 (step 11). That is, the universal OS 33 performs allocation of the entire memory space.

When the image processor IP 11 is in use, the address range 301 corresponding to the second main storage controller 17 is deallocated from under the control of the universal OS 33. Then, the management unit 32 manages the address range 301 (step 12). In other words, the address range 301 corresponding to the second main storage controller 17 is allocated to the image processor IP 11 while the image processor IP 11 is in operation. As described above, the management unit 32 is added independently from the universal OS 33 only when the image processor IP 11 is in operation, After the use of the image processor IP 11, the address range 301 is reallocated to under the control of the universal OS 33. That is, when the image processor IP 11 stops the operation, the universal OS 33 performs the allocation of the address range 301 which has been allocated to the image processor IP 11. Therefore, when the image processor IP 11 is in operation, the image processor IP 11 can occupy the second main storage controller 17, and thus can secure the desirable band width.

Figure 9:
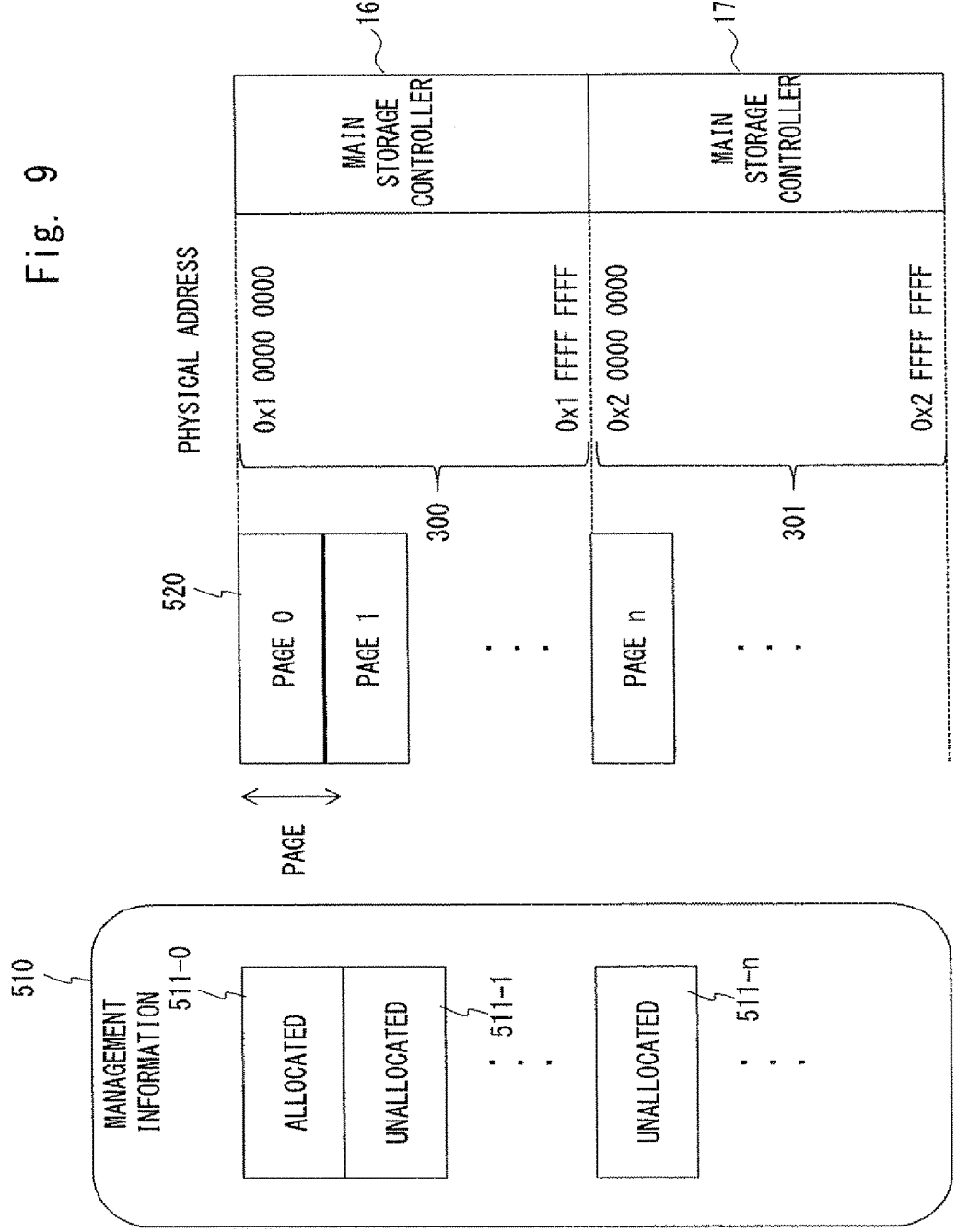
FIG. 9 is a schematic diagram illustrating a correspondence between management information for managing the memory and a page.
Figure 10:
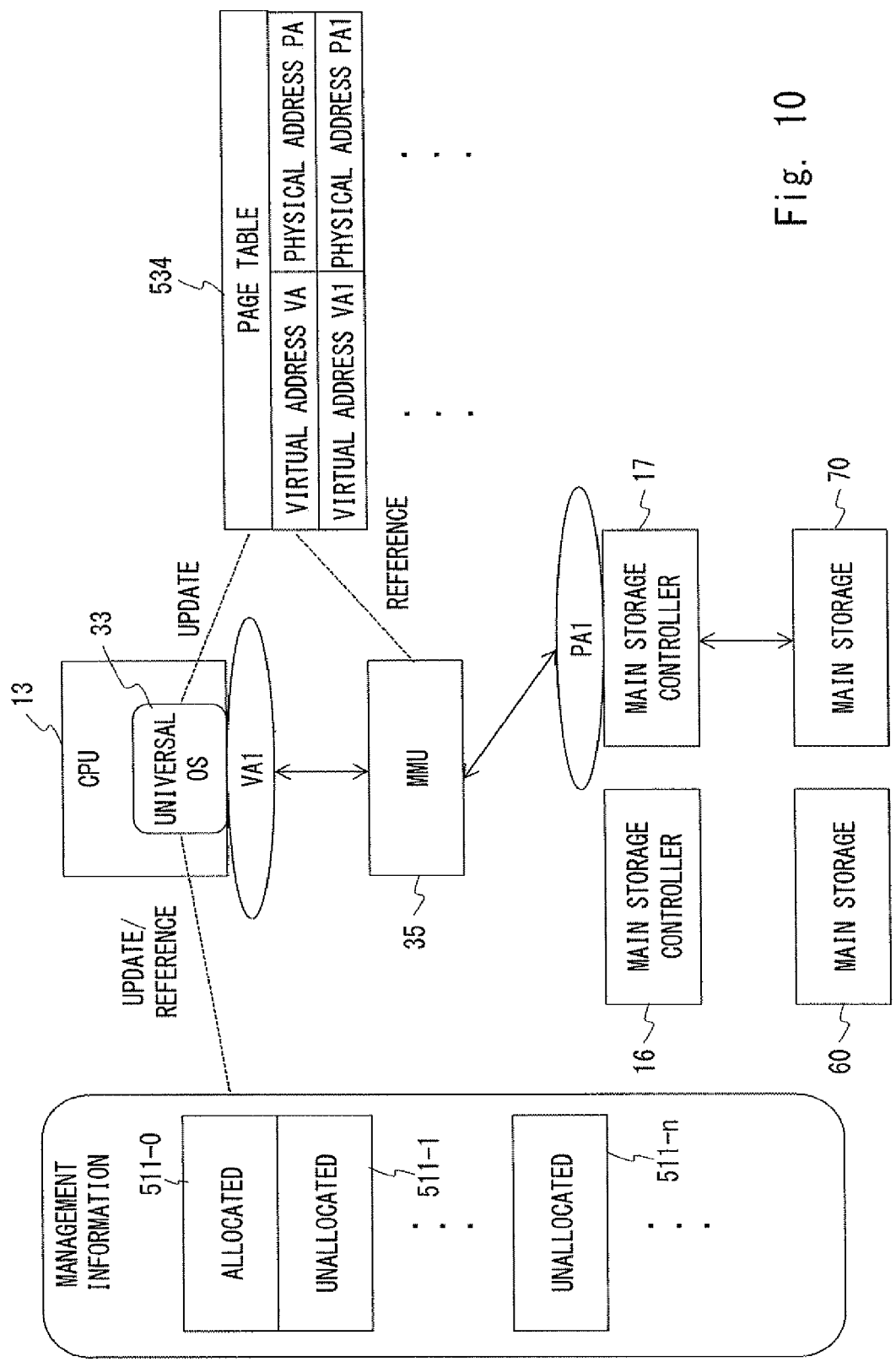
FIG. 10 is a schematic diagram illustrating a page table which shows a correspondence between a virtual address and a physical address.

At the timing when the allocation of the second main storage controller 17 is changed from the CPU 13 to the image processing IP 11, the management unit 32 backs-up the data which was already stored in the second main storage 70. A method to back-up data stored in the second main storage 70 will be described with reference to FIGS. 9 and 10. FIG. 9 is a schematic diagram illustrating management of the first main storage 60 and the second main storage 70. FIG. 10 is a schematic diagram illustrating a page table which shows the correspondence between a virtual address and a physical address.

As shown in FIG. 9, the universal OS 33 manages the memory in a page 520 unit. That is, the second main storage 70 and the first main storage 60 are separated into pages 520 and are allocated in a page unit. In FIG. 9, for identifying each page 520, the page 0, the page 1 and, . . . and page n are illustrated. The pages 520 have the same size. The pages 0 to (n−1) correspond to the address range 300 of the first main storage controller 16 and the pages after the page n correspond to the address range 301 of the second main storage controller 17.

Furthermore, the universal OS 33 has management information 510 for managing the each of the pages 520. The management information 510 has flags 511 which indicate an allocation status of the each page 520. In FIG. 9, the flags 511 which correspond to the page 0, the page 1 and the page n are illustrated as the flag 511-0, the flag 511-1 and the flag 511-n. The flag 511 indicates "allocated" or "unallocated" depending on the page 520. Accordingly, the universal OS 33 can confirm the allocated pages 520 by referring to the management information 510. Furthermore, the universal OS 33 updates the management information 520 based on the allocation status As shown in FIG. 10, the universal OS 33 manages the physical address PA and the virtual address VA using a hardware MMU (Memory Management Unit) 35. The correspondence between the physical address PA and the virtual address VA is managed by a page table 534. For example, the page table 534 stores a pair of the physical address PA and the virtual address VA with respect to each page 520. For example, in the page table 534, a virtual address VA1 corresponds to a physical address PA-1. The MMU 35 converts the addresses with reference to the page table 534.

An operation for data writing will be explained. The CPU 13 designates the virtual address VA, and then performs writing of data. For example, the CPU 13 designates the virtual address VA1 for data writing. Then, the MMU 35 specifies the physical address PA 1 corresponding to the virtual address VA1 with reference to the page table 534.

Then, the CPU 13 outputs the data to the second main storage controller 17 corresponding to the physical address PA1. Then, the second main storage controller 17 writes the data to the second main storage 70 at the physical address PA-1.

The CPU 13 reads out the data from the second main storage 70, like in the data writing process. The CPU 13 designates the virtual address VA to read out the data. Then, the MMU 35 converts the virtual address VA to the physical address PA with reference to the page table 534. Then, the second main storage controller 17 reads out the data of the physical address PA from the second main storage 70 and outputs the read data to the CPU 13.

When the allocation of the address range 301 corresponding to the second main storage controller 17 is changed, the CPU 13 updates the page table 534. The CPU 13 changes the correspondence between the physical address PA and the virtual address VA. The MMU 35 converts the virtual address VA to the physical address PA using the updated page table 534. By doing so, the CPU 13 can write/read the data without designating the physical address PA. Therefore, the CPU 13 can process data appropriately without performing complicated process.

Figure 11:
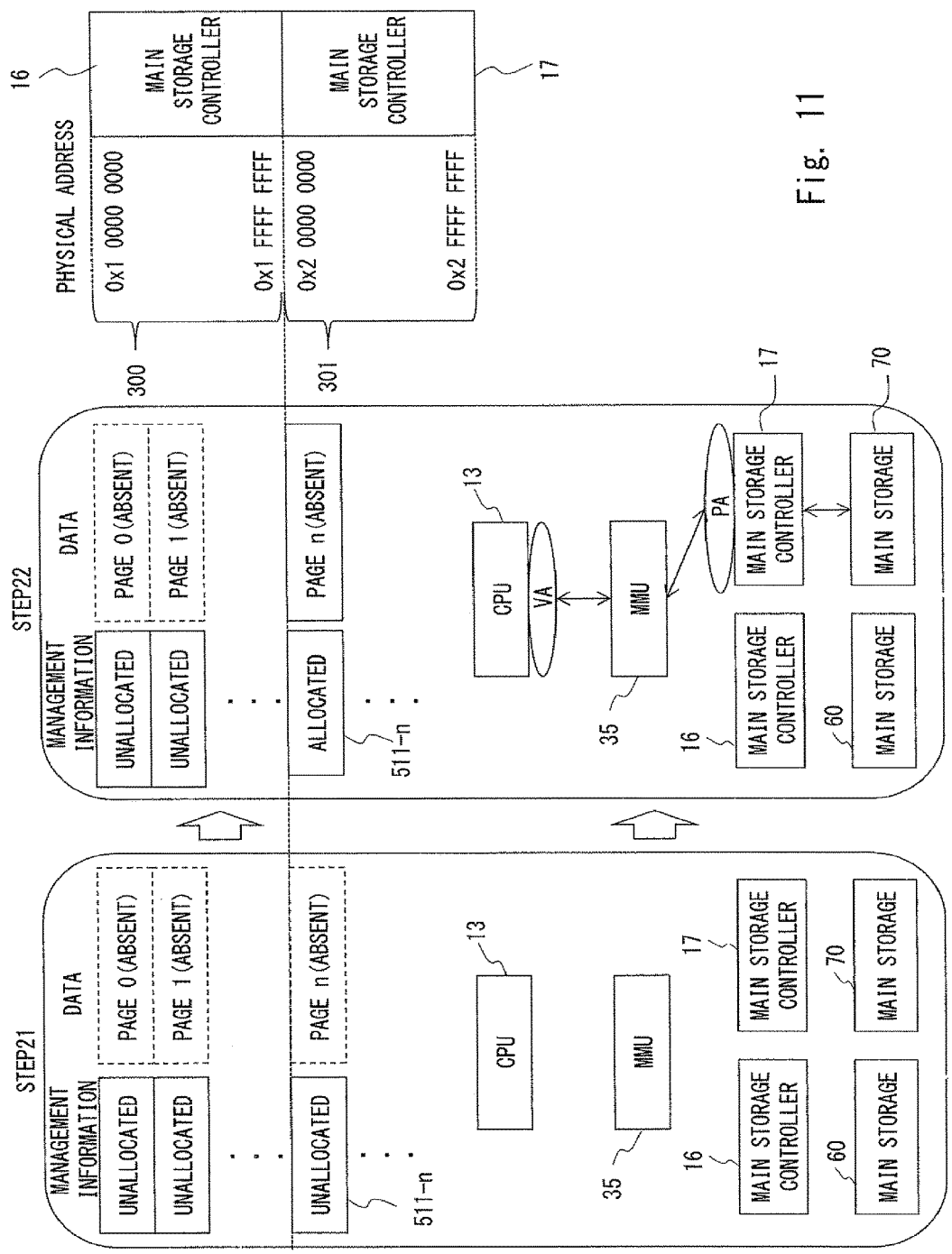
FIG. 11 is a schematic diagram illustrating controls which change an allocation of the image processing IP.

A process for reallocation of the address 301 will be described. A method for deallocating the address range 301 from under the control of the universal OS 33 will be described with reference to FIG. 11. FIG. 11 is a schematic diagram illustrating a process to allocate the address range 301 to the image processing IP 11 when the address range 301 is unallocated.

First, the CPU 13 determines whether the address range 301 is allocated or not with reference to the flags 511 corresponding to the pages of address 301 (step 21). When any "allocated" flags are not included in the pages (the pages after the page n in FIG. 11) corresponding to the address range 301, the CPU 3 determine that the address range 301 is unallocated.

Then, the management unit 32 deallocates the region included in the address range 301 from under the control of the universal OS 33 (step 22). The universal OS sets the flags corresponding to the pages of the address range 301 to "allocated". Furthermore, the universal OS 33 adds a pair of the physical address PA and the virtual address VA of a targeted page to the page table 534. Therefore, the address range 301 is deallocated from under the control of the universal OS 33 and is allocated to under the control of the management unit 32.

Figure 12:
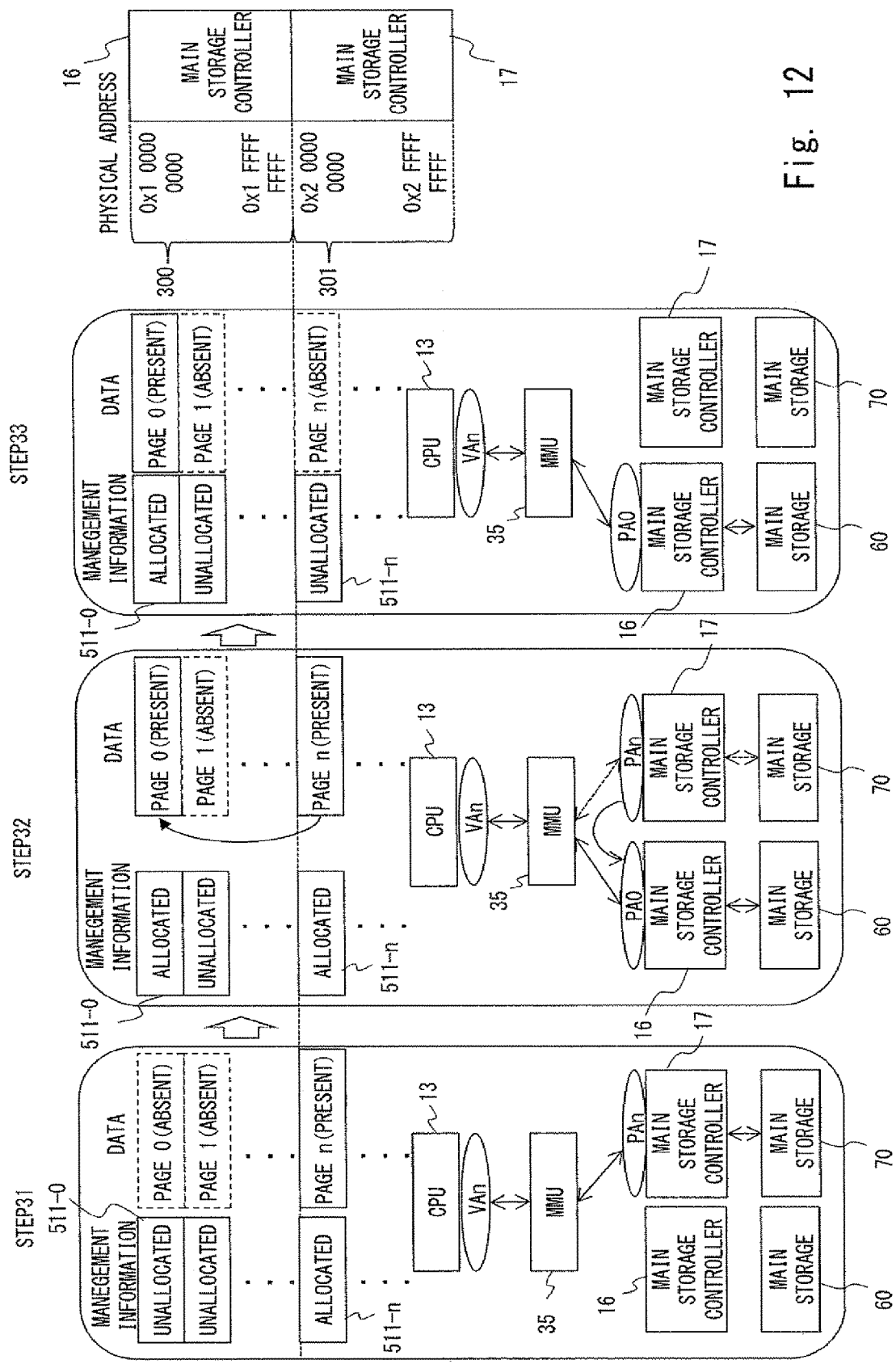
FIG. 12 is a schematic diagram illustrating controls which change the allocation of the image processing IP.

Next, a process when the address range 301 is allocated will be described with reference to FIG. 12. FIG. 12 is a schematic diagram illustrating a process for deallocating the address range 301 from under the control of the universal OS 33 when the universal OS 33 uses the address range 301.

The CPU 13 determines whether the address range 301 is allocated or not with reference to the flags corresponding to the pages of the address range 301 (step 31). The CPU 13 extracts the allocated pages from the address range 301. In FIG. 12, the page n is allocated. Then, the management unit 32 secures an unallocated page 0 in the page 300 and copies the data of the page n to the page 0. Therefore, the data written in the allocated page n in the address range 301 is written into the page 0 (step 32). The CPU 13 then updates the management information. Therefore, the flag 511-0 of the page 0 is set to be allocated.

Furthermore, the CPU 13 rewrites the physical address PAn to the physical address PA0 in the page table, and thereby updates the page table. That is, a physical address paired with the virtual address VAn is updated to the physical address PA0 of the page 0 from the physical address PA of page n.

After updating the page table, the flag 511-*n* of the page n which is a copy source in the address range 301 is set to be unallocated. By doing so, the CPU 13 can use the data, which is stored in the page n before the reallocation, after the reallocation. In the above description, although the data of only the page n is copied to the page 0, the data of all the pages are backed-up to the pages in the address range 300 when there is a plurality of allocated pages in the address range 301. That is, the data of the allocated pages in the address range 301 is copied to unallocated pages in the address range 300.

When the address range 301 is bought back under the control of the OS 33 after the step 33, the following processes are performed. After the image processing IP 11 uses the address range 301, the management unit 32 changes the flags of the management information to be unallocated. That is, the management unit 32 sets all pages in the address range 301 to be unallocated. Therefore, the universal OS 33 can cover the pages of the address range 300 for the allocation in subsequent allocation of the memory.

In this embodiment, the management unit 32 allocates the address range 301 to the image processing IP 11 only when the image processing IP 11 is in operation. That is, the universal OS 33 allocates the address range 301 to the CPU 13 other than the image processing IP 11 when the image processing IP 11 is not in the operation. Therefore, it is possible to use the memory effectively, and to shorten the processing time.

The management unit 32 copies the data stored in the second main storage 70 to the first main storage 60 based on the management information which indicates the allocation status of the first main storage 60 and the second main storage 79 when the image processing IP 11 is switched from the non-operating state to the operating state. By doing so, the CPU 13 can use the date stored in the second main storage 70 when the allocation is changed.

The processor system 10 further includes the MMU 35 referring to the table which relates the virtual address of the memory to the physical address. The CPU 13 designates the virtual address. Then, the MMU 35 refers to the table, and thereby writes/reads the date to/from the first main storage 60 and the second main storage 70. When the image processing IP 11 is switched to the operating state from the non-operating state, the CPU 13 updates the table. Only changing the correspondence between the virtual address and the physical address is necessary in the table. Therefore, the allocation can be changed by a simple process.

Fourth Embodiment

Figure 13:
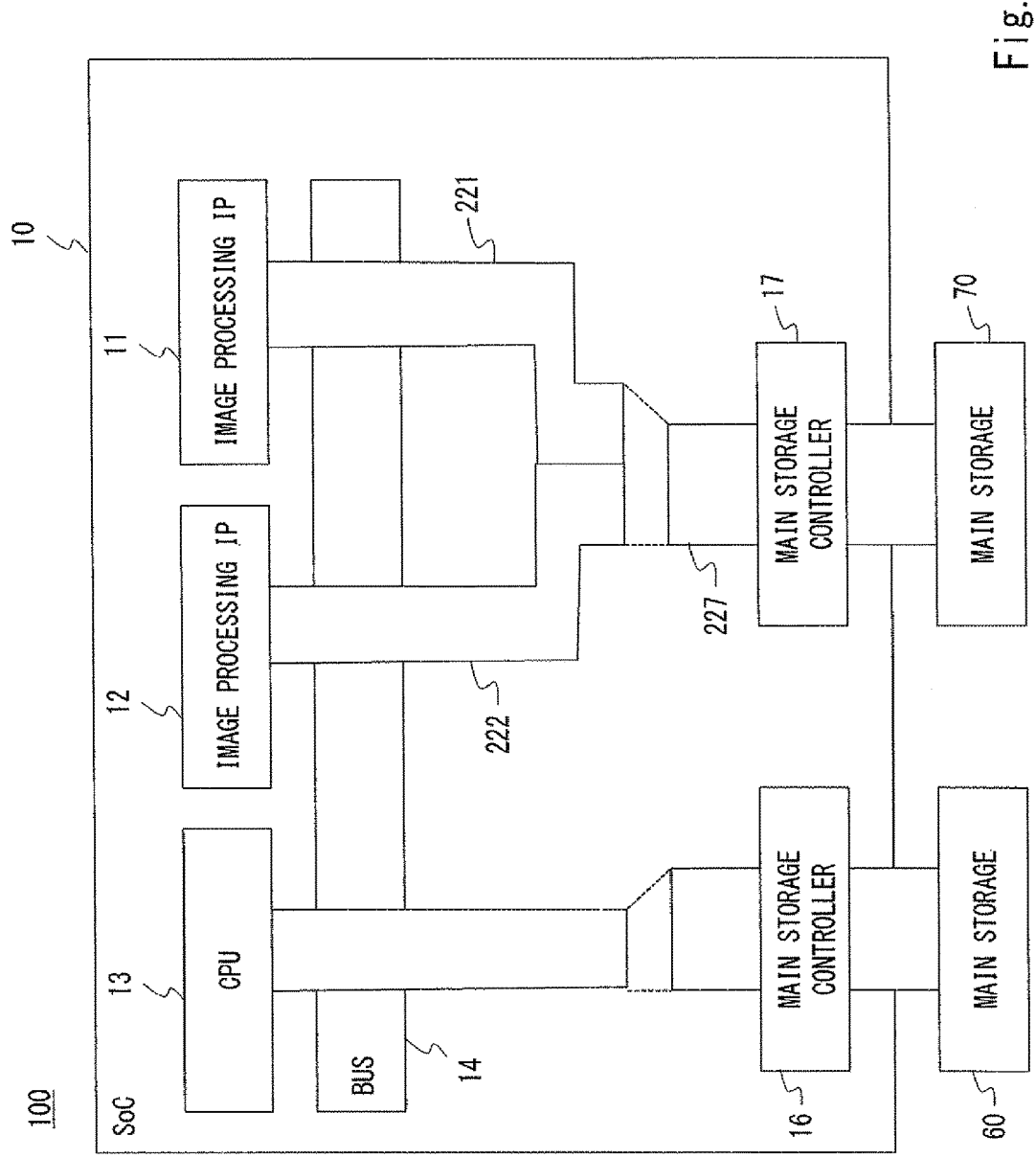
FIG. 13 is a block diagram showing a processor system which includes two image processing IP.

A processor system according to this embodiment includes a plurality of image processor IPs. When the image processor IPs operate at the same time, the image processor IPs may share one main storage controller. For example, as shown in FIG. 13, the processor system 10 includes an image processor IP 11 and an image processor IP 12. The address range of the second main storage controller 17 is allocated to the image processor IP 11 and the image processor IP 12. The data used by the image processor IP 11 and the image processor IP 12 are biased towards the second main storage controller 17.

Then, the sum of a data band width 221 of the image processor IP 11 and a data band width 222 of the image processor IP 12 is more than a data band width 227 of the second main storage controller 17. Thus, the image processor IP 11 or the image processor IP 2 may not secure a desirable data band width. Therefore, there is a possibility that frame dropping may occur during playing of a video by increasing the wait time of the image processing IP 11 or the image processing IP 12 to access the data.

Figure 14:
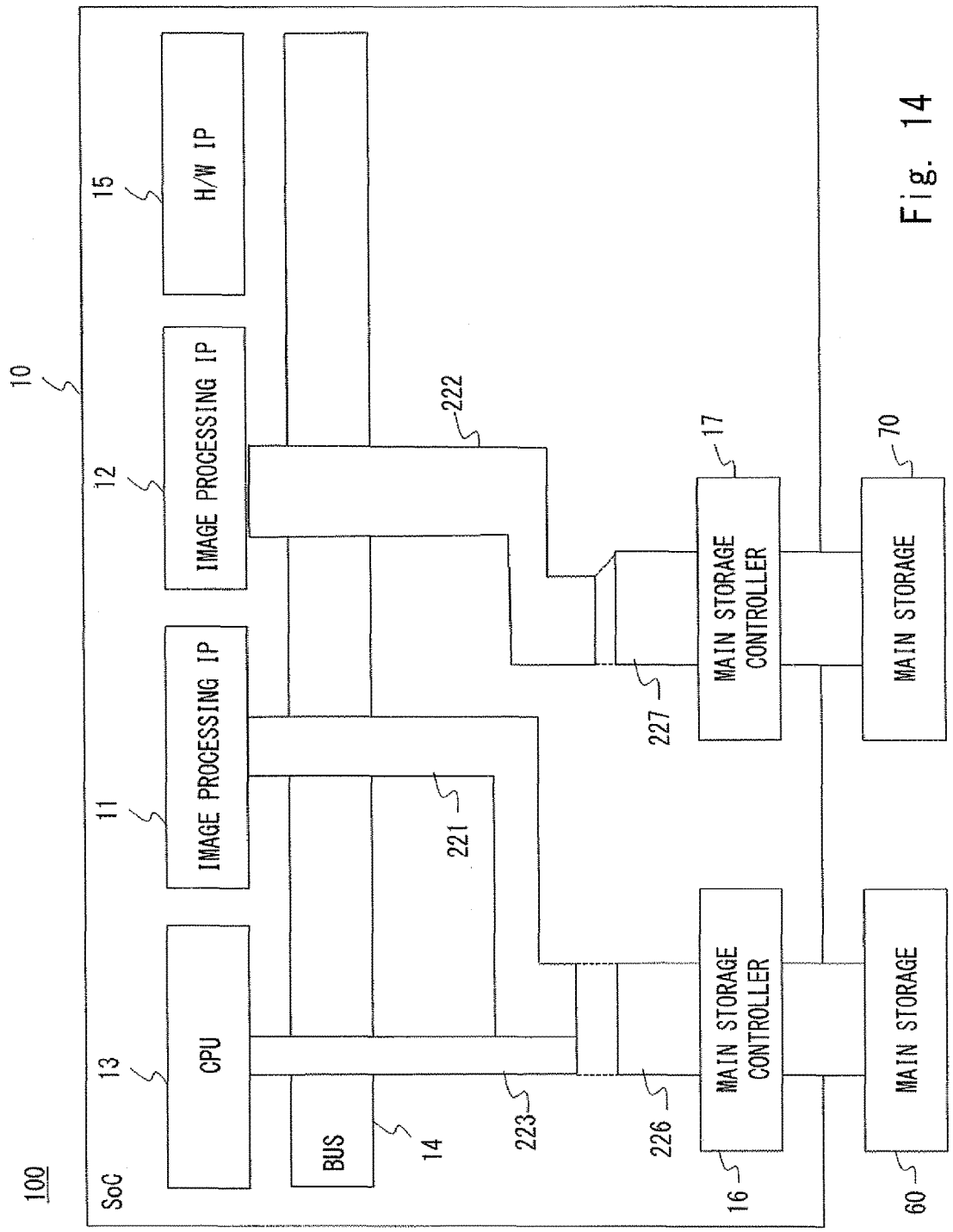
FIG. 14 is a block diagram showing a structure of a semiconductor apparatus according to a fourth embodiment.

Therefore, in this embodiment, the allocation is changed as set forth below. FIG. 14 shows a semiconductor apparatus 100 having a processor system 10 according to this embodiment. The processor system 10 includes the image processing IP 11, the image processing IP 12, the CPU 13 a hardware IP 15 (hereinafter referred to as the H/W IP 15), and the first main storage controller 16 and the second main storage controller 17. That is, in addition to the structure described in the first embodiment, the processor system 10 is provided with the image processing IP 12 and the H/W IP 15. A description similar to that of the above embodiments is omitted as needed.

The H/W IP 15 is an IP core which controls a hardware connected to the processor system 10. H/W IP 15 controls the hardware such as USB (Universal Serial Bus). Assuming that the CPU 13 is a first processor, the image processing IP 11 is a second processor and the image processing IP 12 is a third processor. The image processor IP 11 and the image processor IP 12 perform image processing such as decoding or encoding. The decoding or the encoding processes performed in the image processing IP 11 and the image processing IP 12 may be the same or may be different.

In this embodiment, the image processing IP which needs a relatively wide data band width between the image processing IP 11 and the image processing IP 12 occupies the second main storage controller 17. That is, the image processing IP to be allocated to the second main storage controller 17 is dynamically changed. The image processing IP 11 and the image processing IP 12 change the allocation of memory space in a frame unit.

Figure 15:
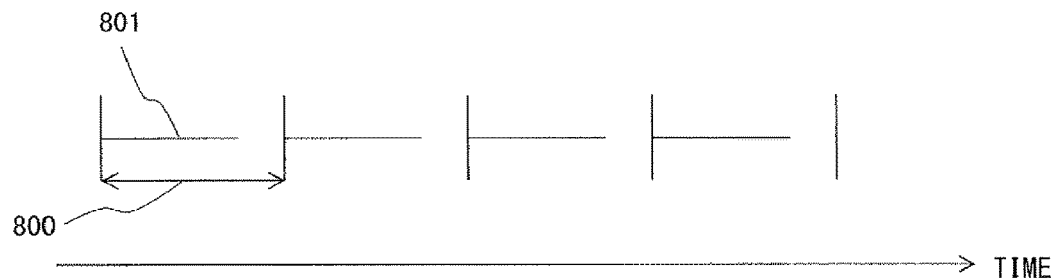
FIG. 15 is a schematic diagram illustrating a relation between frame intervals and processing time.

As shown in FIG. 15, a processing time 801 of the image processing IP 11 or the image processing IP 12 must be shorter than a frame interval 800. If the processing time 801 is more than the frame interval 800, the frame dropping will occur. When the frame rate is 60 fps, the frame interval 801 is about 16.6 msec. The image processing IP 11 and the image processing IP 12 must perform the process within the frame interval 800. The larger the ratio "(processing time 801)/(the frame interval 800)" is, the greater the reduction of the processing time that is needed. That is, the higher the ratio of the processing time 801 divided by the frame interval 800 is, the wider the band width that is desirably allocated.

Therefore, in this embodiment, the management unit 32 measures the processing time 801 of the image processing IP with respect to each frame. Then, the management unit 32 calculates the ratio of the processing time 801 to the frame interval 800, or the ratio "(the processing time 801)/(the frame interval 800)", for every image processing IP. Then, the address range 301 corresponding to the second main storage controller 18 is allocated to the image processing IP having the largest ratio of the processing time 801 to the frame interval 800. The management unit 32 changes the allocation of the memory based on the ratio of the processing time 801 to the frame interval 800. The allocation is changed depending on the process status of the image processor IP 11 and the image processing IP 12.

Regarding the memory allocation, there are two cases. The first one is to change the memory allocation from under the control of the universal OS 33 to under the control of the management unit 32. The second one is to change the memory allocation from under the control of the management unit 32 to under the control of the universal OS 33.

Figure 16:
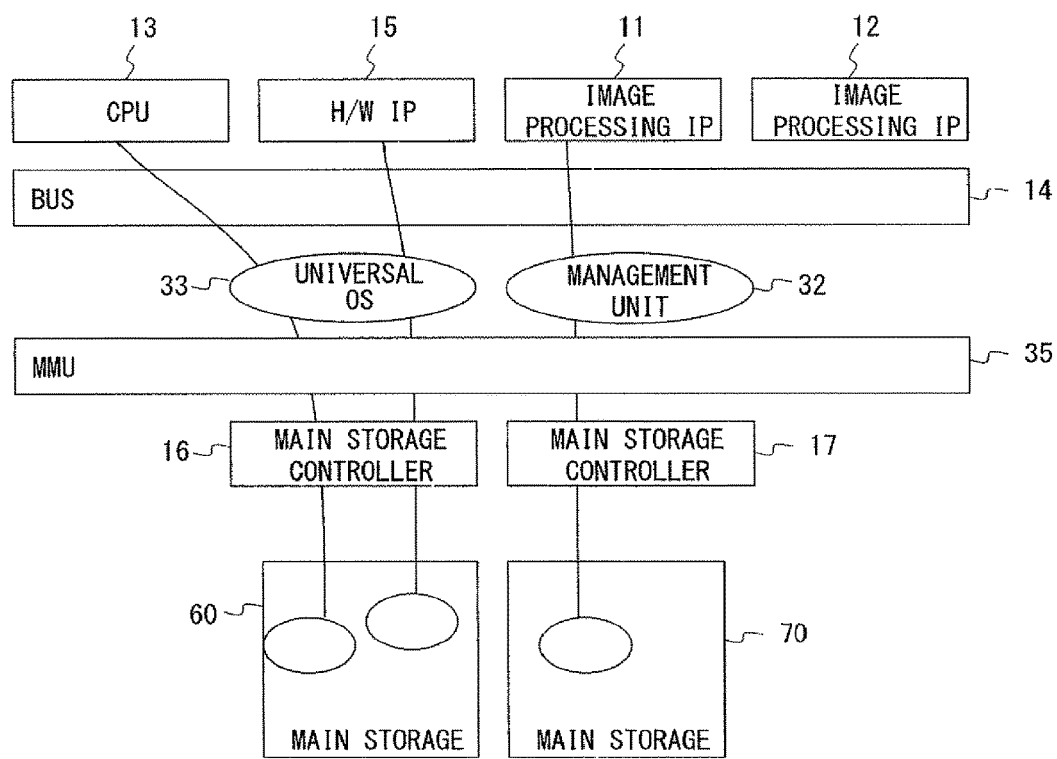
FIG. 16 is a schematic diagram illustrating an example which changes a specific address range from under control of the universal OS to under the control of the management unit.
Figure 17:
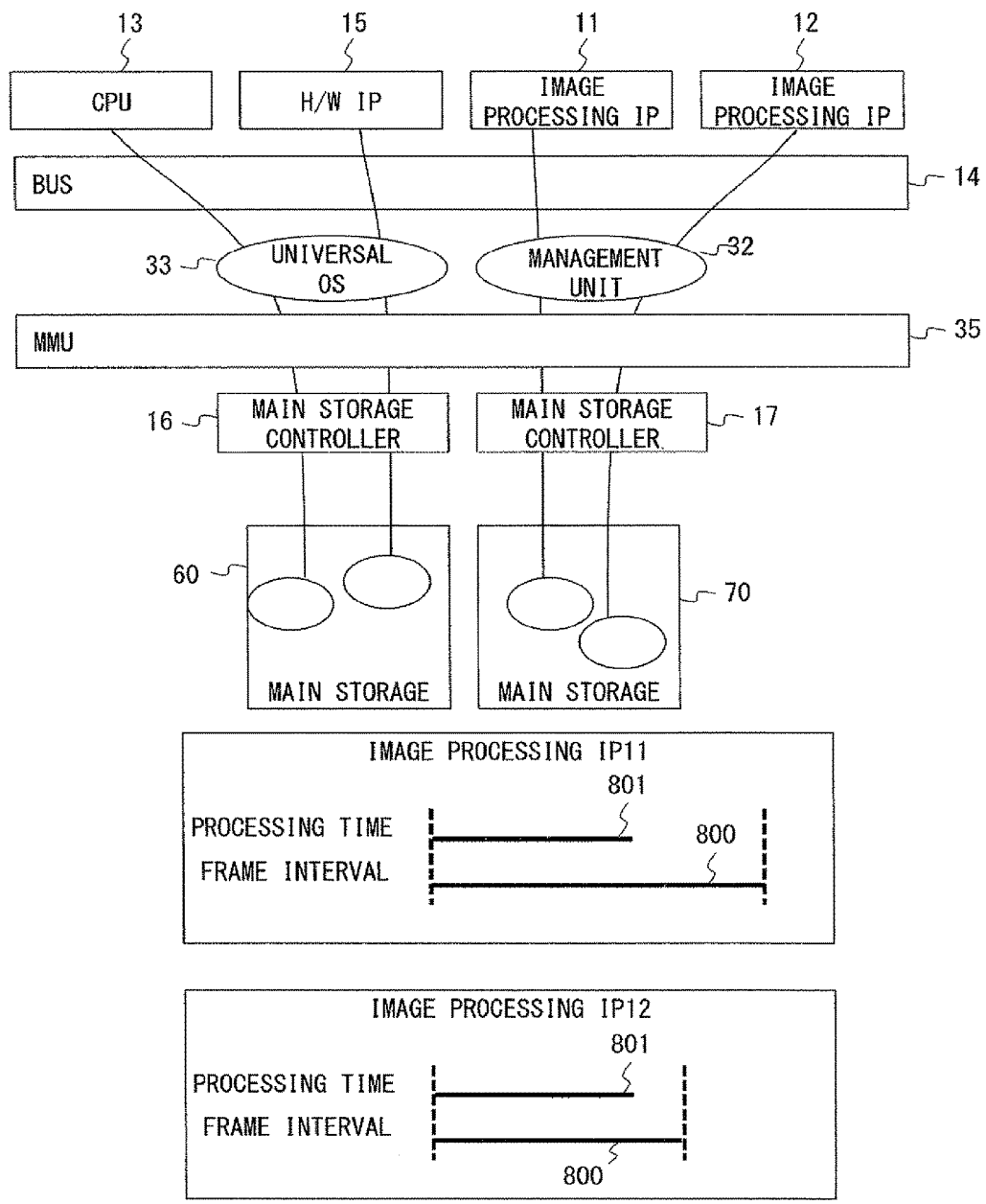
FIG. 17 is a schematic diagram illustrating the example which changes a specific address range from under the control of the universal OS to under the control of the management unit.
Figure 18:
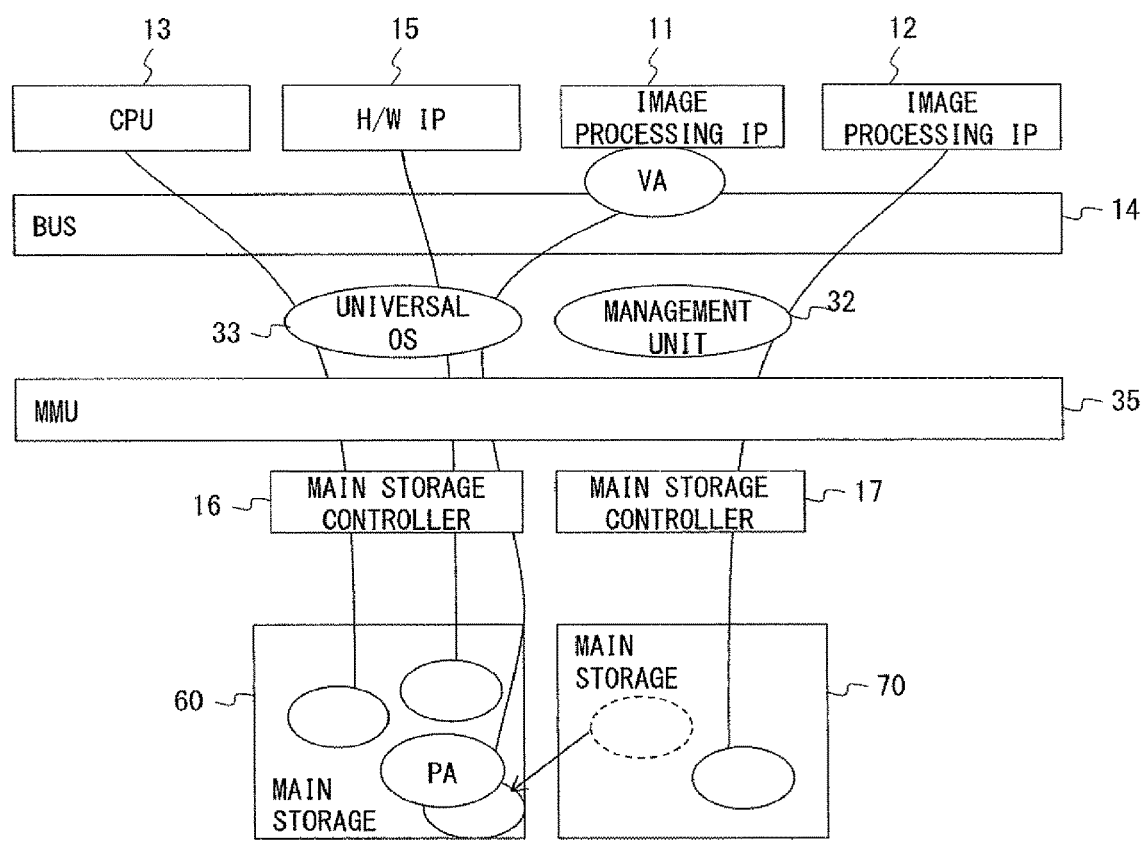
FIG. 18 is a schematic diagram illustrating the example which changes a specific address range from under the control of the universal OS to under the control of the management unit.

First, the case where the memory allocation is changed from under the control of the management unit 32 to under the control of the universal OS 33 will be described with reference to FIGS. 16 to 18. FIGS. 16 to 18 are schematic diagrams illustrating the case where the memory allocation is changed from under the control of the management unit 32 to under the control of the universal OS 33.

At first, the image processing IP 11 is in operation, and the image processing IP 12 is not in operation. In this condition, the image processing IP 11 occupies the second main storage controller 17 similar to the process regarding the first and second embodiments. That is, the management unit 32 allocates the address range of the second main storage 70 to the image processing IP 11. On the other hand, the universal OS 33 allocates the address range of the first main storage 60 to the CPU 13 and the H/W IP 15.

As shown in FIG. 17, the image processing IP 12 starts operation. The management unit 32 measures the processing times of the image processing IP 11 and the image processing IP 12 in one frame. Then, the management unit 32 calculates the ratio "(the processing time 801)/(the frame interval 801)" of the image processing IP 11 and the image processing IP 12, respectively. The management unit 32 compares the ratio "(the processing time 801)/(the frame interval 801)" of the image processing IP 11 with the ratio "(the processing time 801)/(the frame interval 801)" of the image processing IP 12. By using the ratios "(the processing time 801)/(the frame interval 801)", it is possible to perform this comparison appropriately even though the frame interval of the image processing IP 11 differs from the that of the image processing IP 12.

The image processing IP 12 starts the operation under a tighter time constraint than that of the image processing IP 11. Accordingly, the ratio "(the processing time 801)/(the frame interval 801)" of the image processing IP 12 is larger than the ratio "(the processing time 801)/(the frame interval 801)" of the image processing IP 11.

The management unit 32 changes the memory allocation so that the image processing IP 12 occupies the second main storage controller 17. As shown in FIG. 18, the management unit 32 changes the allocation destination of the image processing IP 11 to the first main storage controller 16 from the second main storage controller 17. Accordingly, the CPU 13, the image processing IP 11 and H/W IP 15 share the first main storage controller 16. The second main storage 17 is allocated to the image processing IP 12. As described above, the allocation of the image processing IP 11 is set to be from under the control of the management unit 32 to under the control of the universal OS 33. The allocation of the image processing IP 12 is set to be under the control of the management unit 32. Therefore, the image processing IP 12 occupies the second main storage controller 17.

In the allocation, an address corresponding to the MMU 35 of the H/W IP 15 is set to the image processing IP 11. That is, the region of the address range corresponding to the first main storage controller 16 is allocated to the image processing IP 11. The data which is written into the second main storage 70 by the image processing IP 11 is copied to the first main storage 60 based on the management information. That is, the image processing data of the image processing IP 11, which is stored in the second main storage 70, is, like in the third embodiment, written into vacant pages of the first main storage 60. Therefore, it is possible to back-up the image processing data of the image processing IP 11, which is stored in the second main storage 70, to the first main storage 60.

Then, like in the third embodiment, the management information and the page table are updated. By doing so, it is possible to change the allocation without changing the virtual address. That is, the CPU 13 only designates the virtual address, and thereby the data is written to the appropriate address.

Figure 19:
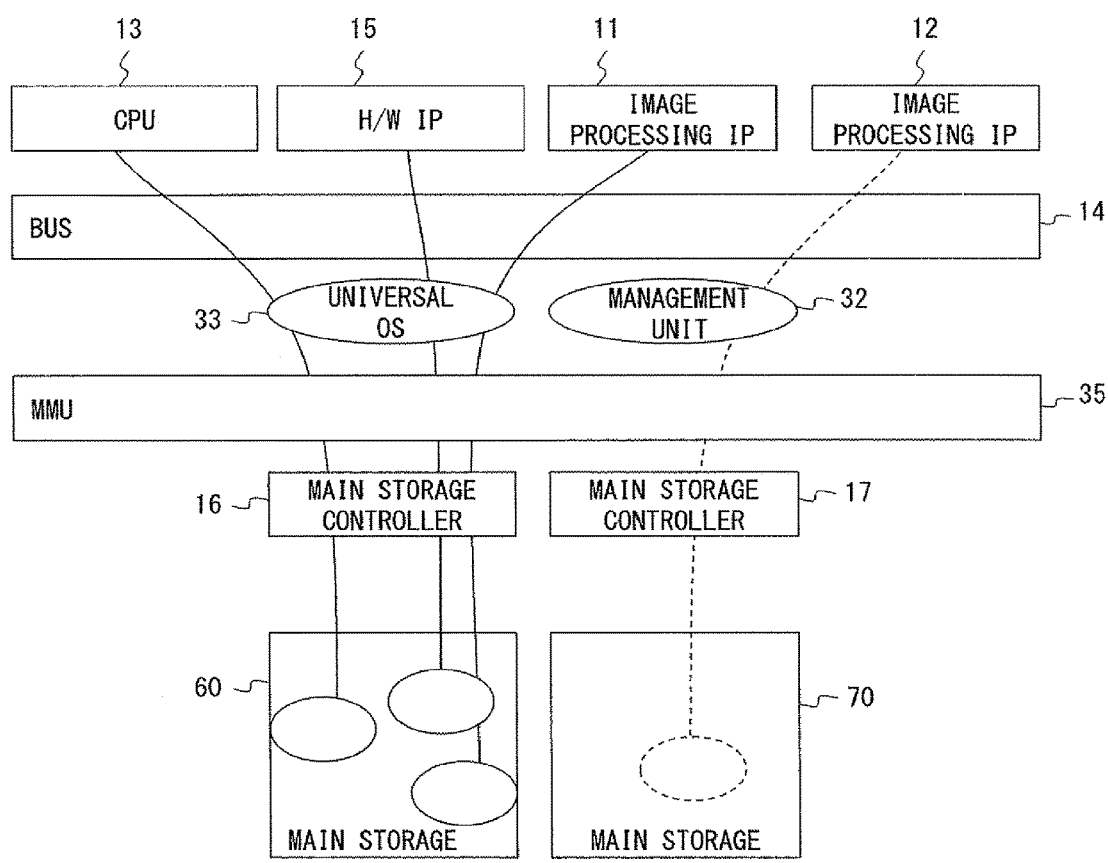
FIG. 19 is a schematic diagram illustrating an example which changes a specific address range from under the control of the management unit to under the control of the universal OS.
Figure 20:
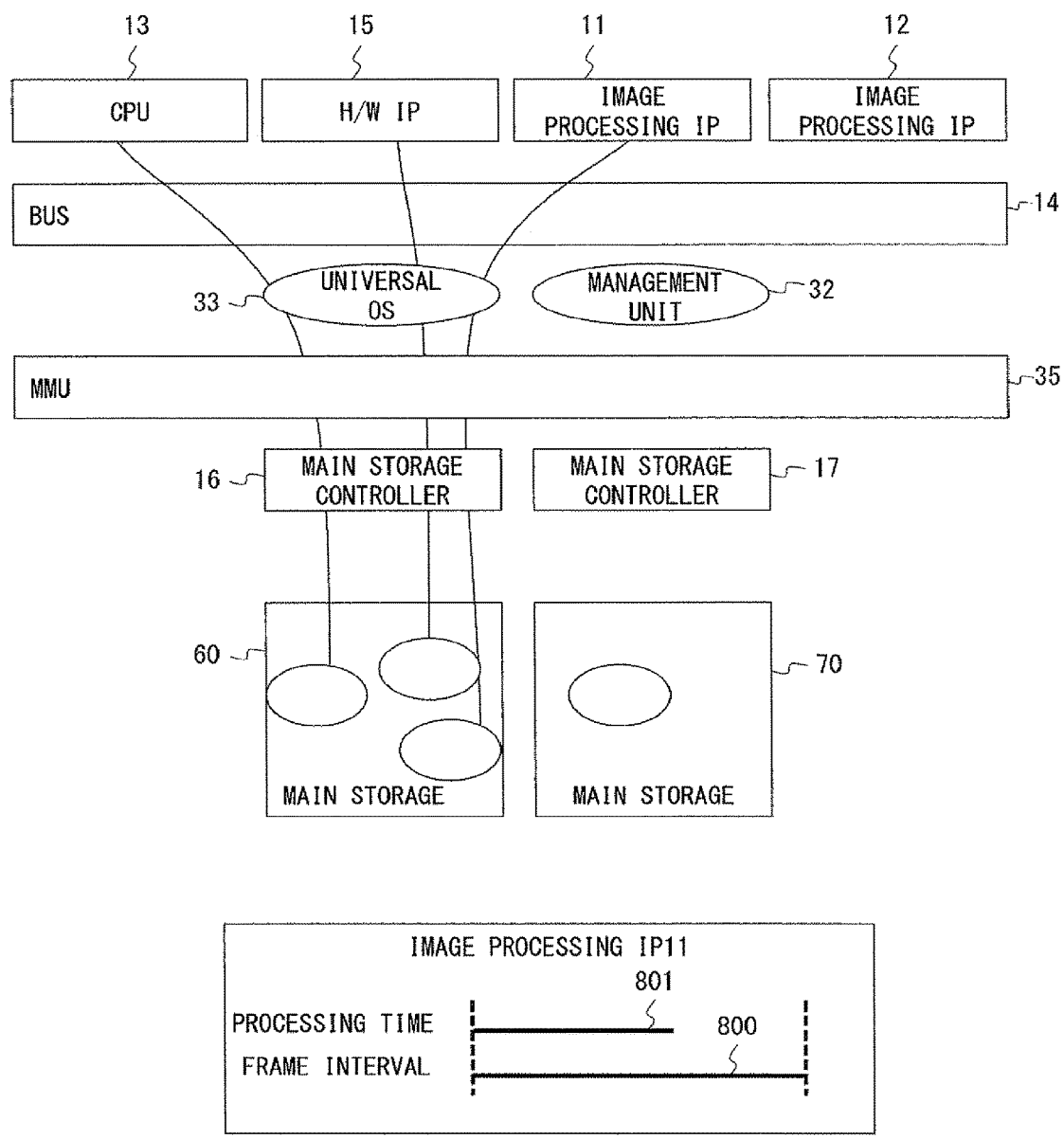
FIG. 20 is a schematic diagram illustrating the example which changes a specific address range from under the control of the management unit to under the control of the universal OS.
Figure 21:
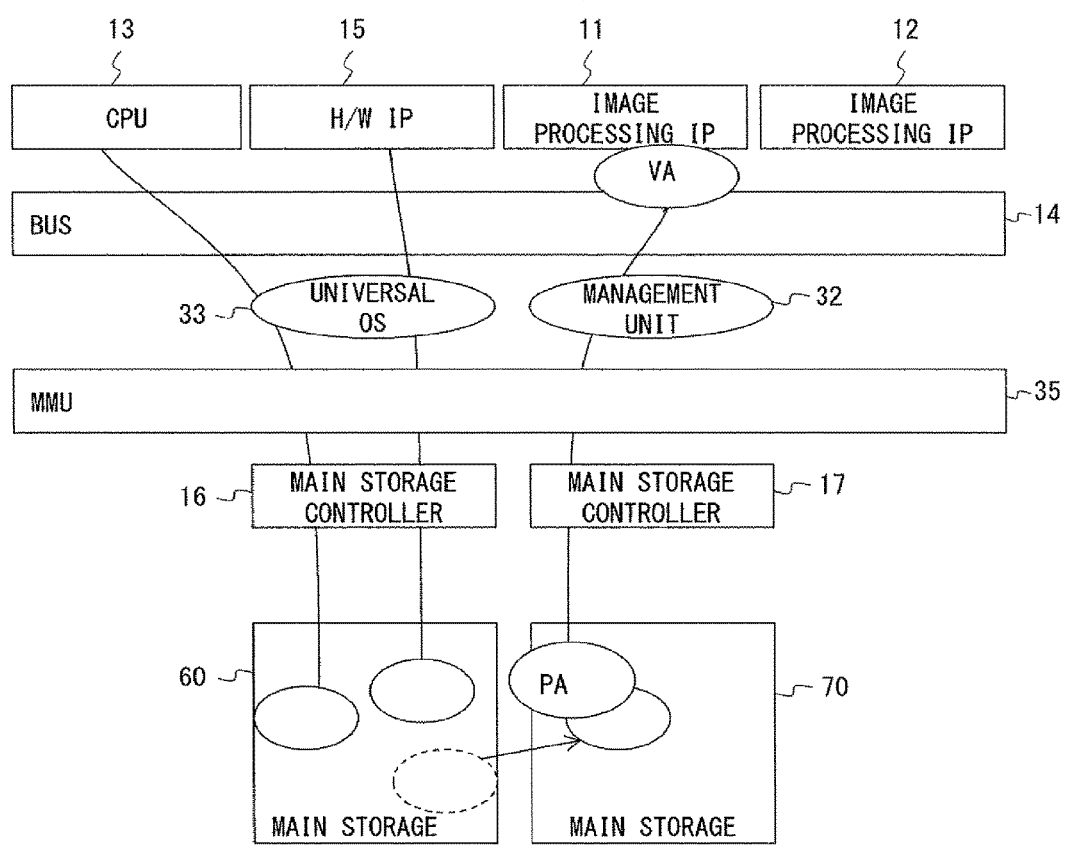
FIG. 21 is a schematic diagram illustrating the example which changes a specific address range from under the control of the management unit to under the control of the universal OS.

Next, the case where the memory allocation is changed from under the control of the universal OS 33 to under the control of the management unit 32 is described with reference to FIGS. 19 to 21. FIGS. 19 to 21 are schematic diagrams illustrating the case where the memory allocation is changed from under the control of the universal OS 33 to under the control of the management unit 32.

First, when the image processing IP 11 and the image processing IP 12 operate simultaneously, the image processing IP 12 occupies the second main storage controller 17. Then, the image processing IP 12 stops the operation as shown in FIG. 19.

The management unit 32 calculates the ratio "(the processing time 801)/(the frame interval 801)" of the each image processing IP in a way similar to the above case. As shown in FIG. 20, the ratio "(the processing time 801)/(the frame interval 801)" of the image processing IP 11 is larger than the ratio "(the processing time 801)/(the frame interval 801)" of the image processing IP 12. That is, since the image processing IP 12 stops the operation, the image processing IP 11 has the tightest time constraint.

The management unit 32 makes the image processing IP 11, which has the tightest time constraint, occupy the second main storage controller 17. That is, the allocation of the image processing IP 11 is set to be changed from being under the control of the universal OS 33 to being under the control of the management unit 32. As shown in FIG. 21, the management unit 32 changes the allocation destination of the image processing IP 11 from the first main storage controller 16 to the second main storage controller 17. The data which is written to the first main storage 60 by the first image processing IP 11 is copied to the second main storage 70. That is, the image processing data, which is stored in the main storage 60, of the image processing IP 11 is, like in the third embodiment, copied to vacant pages of the second main storage similar to that of the third embodiment.

Then, the management information and the page table are updated in a way similar to that of the third embodiment. By doing so, it is possible to change the allocation without changing the virtual address. That is, the CPU 13 only designates the virtual address, and thereby the data is written to the appropriate address.

The image processing IP 11, which has the tightest time constraint, occupies the second main storage controller 17. Therefore, when the image processing IP 11 and the image processing IP 12 operate simultaneously, the data band width 222 of the image processing IP 11 fits into the data band width 227 of the second main storage controller 17.

In the simultaneous operation, the image processing IP 11 has a looser time constraint than that of the image processing IP 12. Accordingly, the data band width 221 of the image processing IP 11 is narrower than the data band width 222 of the image processing IP 12 as shown in FIG. 14. The data of the image processing IP 12 which needs the widest data band width 222 is not routed through the first main storage controller 16. On the other hand, the data of the CPU 13 and the data of the image processing IP 11 are routed through the first main storage controller 16. Since the data band width 221 of the image processing IP 11 is narrow, the sum of the data band width 221 and the data band width 223 of the CPU 13 can fit into the data band width 226 of the first main storage controller 16. Therefore, when a plurality of the image processing IPs operate simultaneously, it is possible to secure a necessary band width and to prevent frame dropping. In FIG. 14, the data band width of the H/W IP 15 is omitted.

Figure 22:
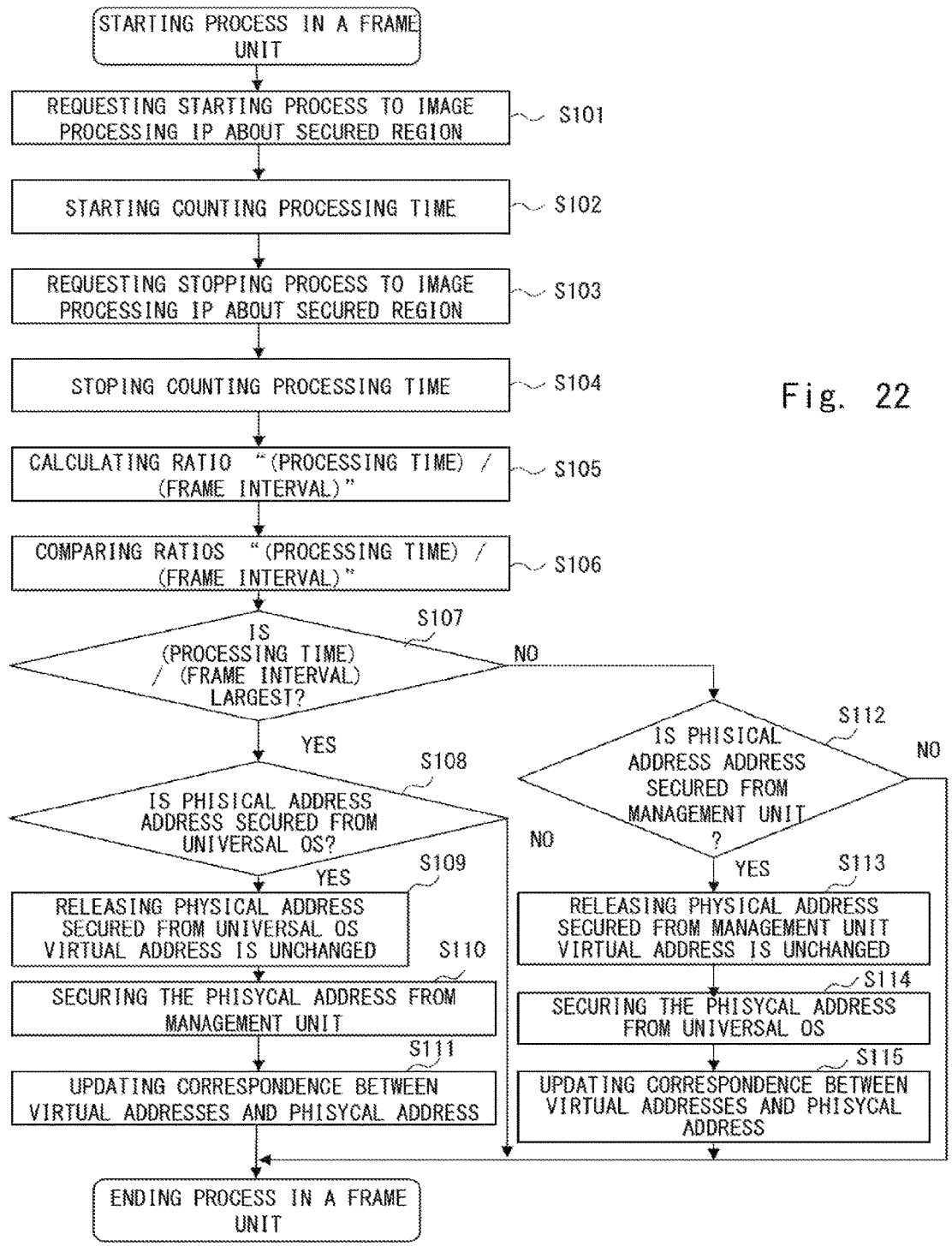
FIG. 22 is a flow chart showing a control method according to the fourth embodiment.

The method for allocating the memory will be described with reference to FIG. 22. FIG. 22 is a flow chart illustrating the method for allocating the memory. Hereinafter, only the process of the image processing IP 11 is described, however the process of the image processing IP 12 is similar to that of the image processing IP 11.

The process in a frame unit is started, and then a request to start a process about a secured region is transmitted to the image processing IP 11 (step 101). That is, the image processing IP 11 starts the process about a region which has already been allocated. Therefore, the image processing IP 11 writes or reads the image processing data to or from the memory. Then, the image processing IP 11 starts counting the processing time (step 102). That is, a count starting time is set to the time when requesting the process start.

A request to stop the process about the secured region is transmitted to the image processing IP 11 (step 103). That is, the image processing IP 11 stops the process about the region which has already been allocated. Accordingly, the image processing IP 11 stops writing or reading the data to/from the memory. The image processing IP 11 stops counting the processing time (step 104). That is, a count stopping time is set to the time when the process stop is requested. The difference between the count start time and the count stop time is the process time. The image processing IP 11 calculates a ratio "(processing time 801)/(frame interval 800)" (step 105).

The CPU 13 compares a ratio "(processing time 801)/(frame interval 800)" of the image processing IP 11 with a ratio "(processing time 801)/(frame interval 800)" of the other image processing IP. The ratio "(processing time 801)/(frame interval 800)" of the image processing IP 12 is calculated in a manner similar to that of the image processing IP 11. The CPU 13 compares the ratio "(processing time 801)/(frame interval 800)" of the image processing IP 11 with the ratio "(processing time 801)/(frame interval 800)" of the image processing IP 12.

Then, when the ratio "(processing time 801)/(frame interval 800)" of the image processing IP 11 is the largest, the process moves to step 108. When the ratio "(processing time 801)/(frame interval 800)" of the image processing IP 11 is not the largest, that is, when the ratio "(processing time 801)/(frame interval 800)" of the image processing IP 12 is the largest, the process moves to step 112.

When step 107 is YES, a process is performed so that the image processing IP 11 occupies the second main storage controller 17. It is then determined whether the physical address allocated to the image processing IP 11 is an address which is secured from the universal OS 33 (step 108). That is, it is determined whether the universal OS 33 allocates the memory to the image processing IP 11 or not.

When the physical address allocated to the image processor IP 11 is the address which is secured from the universal OS 33 (YES in step 108), the management unit 32 releases the physical address which is secured from the universal OS 33. At this time, the virtual address is unchanged. The physical address to be allocated to the image processing IP 11 is secured from the management unit 32 (step 110). That is, the management unit 43 secures the address corresponding to the second main storage 70, and then allocates the secured address to the image processing IP 11. Then, the CPU 13 updates the correspondence between the virtual address and the physical address (step 111). That is, the CPU 13 updates the page table. As described above, the process in a frame unit then ends.

When the physical address allocated to the image processor IP 11 is not the address which is secured from the universal OS 33 (NO in step 108), the image processing IP 12 has already occupied the second main storage controller 17. That is, the management unit 32 secures the address in the image processing TP 12 in a previous frame. Accordingly, the allocation of the memory is not changed, and the image processing IP 11 continuously occupies the second main storage controller 17. Then, the process in a frame unit ends.

When step 107 is NO, it is determined whether the physical address which is allocated to the image processing IP 11 is the address which is secured from the management unit 32 or not. That is, it is determined whether the management unit 32 allocated the memory to the image processing IP 11 or not.

When the physical address which is allocated to the image processing IP 11 is the address which is secured from the management unit 32 (YES in step 112), the universal OS 33 releases the physical address which is secured from the management unit 32. At this time, the virtual address is unchanged. Then, the physical address to be allocated from the universal OS 32 to the image processing IP is secured (step 114). That is, the universal OS 33 secures the address corresponding to the first main storage 60, and allocates the secured address to the image processing IP 11. Then, the CPU 13 updates the correspondence between the virtual address and the physical address (step 115). That is, the CPU 13 updates the page table (step 115). Then, the process in a frame unit ends.

When the physical address which is allocated to the image processing IP 11 is not the address which is secured from the management unit 32 (NO in step 112), the address corresponding to the first main storage controller 16 has been already allocated to the image processing IP 11. That is, the management unit 32 secures the address in the image processing IP 11 in a previous frame. Accordingly, the allocation of the memory is not changed, and the address corresponding to the first main storage controller 16 continues to be allocated to the image processing IP 11. Then, the process in a frame unit ends.

As described above, the allocation is changed based on the result of the comparison of the ratios "(processing time 801)/(frame interval 800)". By doing this, the image processing IP which needs the widest band width can occupy the second main storage controller 17. That is, when the plurality of the image processing IPs operate at the same time, the image processing IP which needs a reduction of the processing time most can be allocated to the second main storage controller 17. Therefore, it is possible to perform the process at high speeds, and thus to prevent the frame dropping during playing of the video. Furthermore, the flow illustrated in FIG. 22 is repeated in each frame, and thereby the allocation of memory can be dynamically changed in accordance with the process status of the image processing IPs. Therefore, it is possible to use the memory effectively.

By setting the virtual address to the image processor IP, it is possible to perform the reallocation. When the reallocation occurs in each frame, only the physical address of the MMU of IP needs to be changed. No modification of the image processing driver is necessary. That is, it is possible to change the allocation without changing the address to be set to the image processing IP.

As described above, when the processing time of the image processing IP 11 is longer than that of the image processing IP 12 in a frame, the address range corresponding to the main storage 70 is deallocated from the image processing IP 11, and then the deallocated address is allocated to the image processing IP 12. Therefore, it is possible to use the memory effectively.

When the address range corresponding to the second main storage 70 is deallocated from the image processing IP 11, the data stored in the second main storage 70 is copied to the first main storage 60 based on the management information which indicates the allocation status of the first main storage 60 and the second main storage 70. Therefore, the image processing IP 11 can use the image processing data stored in the second main storage 70 under the situation where the allocation is changed.

The MMUS 35 refers to the table which relates the virtual address to the physical address in the first main storage 60 and the second main storage 70. The CPU 13 designates the virtual address, and thus the MMU 35 refers to the table, and performs writing/reading of the data to/from the memory of the first main storage 60 and the second main storage 70. When the address range corresponding to the second main storage 70 is deallocated from the image processing IP 11, the CPU 13 updates the table. In the table, only changing the correspondence between the virtual address and the physical address is necessary. Therefore, it is possible to change the allocation by a simple process.

In the fourth embodiment, the processor system 10 including the two image processing IPs 11 and 12. The processor system 10, however, may include three or more image processing IPs. In this case, the ratios "(processing time 801)/(frame interval 800)" are calculated for three or more image processing IPs, respectively. Then the image processing IP which has the largest ratio "(processing time 801)/(frame interval 800)" may occupy the second main storage controller 17. Of course, two or more main storages and main storage controllers may be occupied when there are three or more main storages and main storage controllers. In this case, the management unit 32 may determine two or more image processing IPs which occupy the main storage controller based on the ratios "(processing time 801)/(frame interval 800)".

If the H/W IP 15 needs a wider band width than those of the image processing IPs, the H/W IP 15, instead of the image processing IP, can occupy the second main storage controller 17. The IP which has the tightest time constraint among all the processors may occupy the second main storage controller 17. Therefore, it is possible to use the memory effectively.

For example, when the H/W IP 15 is an IP core to control the USB or the like, the management unit 32 requests a ratio of an actual data transfer rate to the maximum data transfer rate of the H/W IP 15. The maximum data transfer rate is a value based on the standard value. Then, the ratio "(actual data transfer rate)/(maximum data transfer rate)" is compared with the ratio "(processing time 801)/(frame interval 800)".

The management unit 32 determines which IP occupies the second main storage controller 17 based on the comparison result. The address range corresponding to the second main storage 70 is allocated to the H/W IP 15 in accordance with the process status among the image processing IP 11, the image processing IP 12 and H/W IP 15. That is, the IP which has the tightest time constrain among all the processors gets preference over other IPs according to status of the band and the second main storage 70 is allocated to this IP. Therefore, the second main storage controller 17 is allocated to the IP which has the tightest time constraint among all the processors. Accordingly, it is possible to use the memory effectively.

As described above, the processor system 10 may include the H/W IP 15 which controls the hardware connected with the processor system 10. The address range corresponding to the second main storage 70 is exclusively allocated to the H/W IP 15 according to the process status among the image processing IP 11, the image processing IP 12 and the H/W IP 15. By doing this, it is possible to use the memory effectively.

The processor which is included in the processor system 10 according to the present embodiments is not limited to the image processor such as the image processing IP 11. That is, in the processor system which includes a plurality of processors other than the image processor, the above mentioned procedure may change the memory allocation to the processors. In the processor system including the processors other than the image processor, it is possible to change the memory allocation dynamically as described in the fourth embodiment. In this case, the time for the processor to process a predetermined data unit may be compared with that of other processors. That is, in the processor system which includes first to the third processor, when the time to process the predetermined data unit of the third processor is longer than that of the second processor, the address range corresponding to a second memory is allocated from the second processor to the third processor.

At least two embodiments among the first to fourth embodiments can be combined as desirable as one of ordinary skill in the art. For example, the third embodiment and the fourth embodiment can be combined. By doing this, it is possible to use the memory effectively.

It is also possible to package a semiconductor chip including the processor system 10 and a semiconductor chip including the first main storage 60 and the second main storage 70 as one system package.

All or some of the exemplary embodiments disclosed above can be described by, but not limited to, the following supplementary notes.

(Supplementary Note 1)

A processor system comprising:

a first memory controller that controls writing/reading data to/from a first memory;

a second memory controller that controls writing/reading data to/from a second memory;

a first processor that inputs and outputs the data from and to the first memory through a bus;

a second processor that inputs and outputs processed data from and to the second memory through the bus; and a management unit that deallocates an address range corresponding to the second memory from the first process and allocates the address range to the second processor.

(Supplementary Note 2)

The processor system according to the supplementary note 1, wherein a universal OS allocates at least a part of an address range corresponding to the first memory to the first processor, and the management unit allocates, independently of the universal OS, the address range corresponding to the second memory to the second processor.

(Supplementary Note 3)

The processor system according to supplementary note 1, wherein the management unit exclusively allocates the address range of the second memory to the second processor.

(Supplementary Note 4)

The processor system according to the supplementary note 2, wherein when the second processor operates, the management unit deallocates the address range of the second memory from under the control of the universal OS and allocates the address range of the second memory to the second processor, and when the second processor does not operate, the management unit allocates the address range of the second memory to under the control of the universal OS.

(Supplementary Note 5)

The processor system according to the supplementary note 2, wherein when the second processor is switched from a non-operating state to an operating state, the management unit copies the date stored in the second memory to the first memory based on management information indicating a state of allocation of the first and second memories.

(Supplementary Note 6)

The processor system according to the supplementary note 5, further comprising: a memory management unit that refers to a table corresponding to a virtual address and a physical address of the first and the second memories, wherein the first processor designates the virtual address and then the data is written/read to/from the first and second memories, and the first processor updates the table when the second processor is switched from a non-operating state to an operating state.

(Supplementary Note 7)

The processor system according to the supplementary note 2, further comprising: a third processor that operates in parallel with the second processor, wherein when a time that the third processor processes a predetermined data unit is longer than that of the second processor, the address range corresponding to the second memory is deallocated from the second processor and is allocated to the third processor.

(Supplementary Note 8)

The processor system according to the supplementary note 7, wherein when the address range corresponding to the second memory is deallocated from the second processor, the management unit copies the data stored in the second memory to the first memory based on management information indicating an allocation status of the first and the second memories.

(Supplementary Note 9)

The processor system according to the supplementary note 8, further comprising: a memory management unit that refers to a table corresponding to a virtual address and a physical address of the first and the second memories, wherein the first processor designates the virtual address and then the data is written/read to/from the first and second memories, and the first processor updates the table at a timing when the address range corresponding to the second memory is deallocated from the second processor.

(Supplementary Note 10)

The processor system according to the supplementary note 7, further comprising: a hardware IP that controls hardware connected to the processor system, wherein the address range corresponding to the second memory is allocated based on a processing status of each of the second processor, the third processor and the hardware IP.

(Supplementary Note 11)

A semiconductor apparatus comprising:

a processor system according to claim 1;

a first memory that stored date, the first memory controller controlling data writing/reading to/from the first memory; and a second memory that stored date, the first memory controller controlling data writing/reading to/from the second memory.

(Supplementary Note 12)

A control method of a processor system;

the processor system including;

a first memory controller that controls writing/reading data to/from a first memory;

a second memory controller that controls writing/reading data to/from a second memory;

a first processor that inputs and outputs the data from and to the first memory through a bus; and a second processor that inputs and outputs processed data from and to the second memory through the bus;

the method comprising:

deallocating an address range corresponding to the second memory from the first memory; and allocating the address range corresponding to the second memory to the second processor.

(Supplementary Note 13)

The method according to the supplementary note 12;

wherein a universal OS allocates at least a part of an address range corresponding to the first memory to the first processor, and the address range corresponding to the second memory is allocated to the second processor independently of the universal OS.

(Supplementary Note 14)

The method according to the supplementary note 12, wherein the address range of the second memory is exclusively allocated to the second processor.

(Supplementary Note 15)

The method according to the supplementary note 12, wherein when the second processor operates, the address range of the second memory is deallocated from under the control of the universal OS and is allocated to the second processor, and when the second processor does not operate, the address range of the second memory is allocated to under the control of the universal OS.

(Supplementary Note 16)

The method according to the supplementary note 15, wherein when the second processor is switched from a non-operating state to an operating state, the management unit copies the date stored in the second memory to the first memory based on management information indicating a state of allocation of the first and second memories.

(Supplementary Note 17)

The method according to the supplementary note 16, the processor system further comprising: a memory management unit that refers to a table corresponding to a virtual address and a physical address of the first and the second memories, wherein the first processor designates the virtual address and then the data is written/read to/from the first and second memories, and the first processor updates the table at a timing when the second processor from a non-operating state to an operating state.

(Supplementary Note 18)

The method according to the supplementary note 16, the processor system further comprising: a third processor that operates in parallel with the second processor, wherein when a time that the third processor processes a predetermined data unit is longer than that of the second processor, the address range corresponding to the second memory is deallocated from the second processor and is allocated to the third processor.

(Supplementary Note 19)

The method according to the supplementary note 18, wherein when the address range corresponding to the second memory is deallocated from the second processor, the data stored in the second memory is copied to the first memory based on management information indicating an allocation status of the first and the second memories.

(Supplementary Note 20)

The method according to the supplementary note 19, the processor system further comprising: a memory management unit that refers to a table corresponding to a virtual address and a physical address of the first and the second memories, wherein the first processor designates the virtual address and then the data is written/read to/from the first and second memories, and the first processor updates the table when the address range corresponding to the second memory is deallocated from the second processor.

(Supplementary Note 21)

The method according to supplementary note 18, further comprising; the hardware IP that controls a hardware connected to the processor system, wherein the address range corresponding to the second memory is exclusively allocated to the hardware IP based on a processing status among the second processor, the third processor and the hardware IP.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A system on a chip comprising:
    a first memory controller that controls writing/reading data to/from a first memory;
    a second memory controller that controls writing/reading data to/from a second memory;
    a first processor that inputs and outputs the data from and to the first memory through a bus;
    a second processor that inputs and outputs processed data from and to the second memory through the bus; and
    a management unit that deallocates an address range corresponding to the second memory from the first processor and allocates the address range to the second processor,
    wherein the first processor includes the management unit,
    wherein a universal Operating System (OS) allocates at least a part of an address range corresponding to the first memory to the first processor, and
    the management unit allocates, independently of the universal OS, the address range corresponding to the second memory to the second processor.

2. The system on a chip according to claim 1, wherein
    when the second processor operates, the management unit deallocates the address range of the second memory from under control of the universal OS and allocates the address range of the second memory to the second processor, and
    when the second processor does not operate, the management unit allocates the address range of the second memory to under the control of the universal OS.

3. The system on a chip according to claim 1, wherein when the second processor is switched from a non-operating state to an operating state, the management unit copies the data stored in the second memory to the first memory based on management information indicating a state of allocation of the first and second memories.

4. The system on a chip according to claim 3, further comprising:
    a memory management unit that refers to a table corresponding to a virtual address and a physical address of the first and the second memories,
    wherein the first processor designates the virtual address and then the data is written/read to/from the first and second memories, and
    the first processor updates the table when the second processor is switched from a non-operating state to an operating state.

5. The system on a chip according to claim 1, further comprising:
    a third processor that operates in parallel with the second processor,
    wherein when a time that the third processor processes a predetermined data unit is longer than a time that the second processor processes a predetermined data unit, the address range corresponding to the second memory is deallocated from the second processor and is allocated to the third processor.

6. The system on a chip according to claim 5,
    wherein when the address range corresponding to the second memory is deallocated from the second processor, the management unit copies the data stored in the second memory to the first memory based on management information indicating an allocation status of the first and the second memories.

7. The system on a chip according to claim 6, further comprising:
    a memory management unit that refers to a table corresponding to a virtual address and a physical address of the first and the second memories,
    wherein the first processor designates the virtual address and then the data is written/read to/from the first and second memories, and
    the first processor updates the table at a time when the address range corresponding to the second memory is deallocated from the second processor.

8. The system on a chip according to claim 5, further comprising:
    a hardware IP that controls hardware connected to the processor system,
    wherein the address range corresponding to the second memory is allocated based on a processing status of each of the second processor, the third processor and the hardware IP.

* * * * *